(12) United States Patent
Lee et al.

(10) Patent No.: US 10,992,816 B2
(45) Date of Patent: Apr. 27, 2021

(54) MOBILE TERMINAL AND CONTROL METHOD THEREFOR

(71) Applicant: LG ELECTRONICS INC., Seoul (KR)

(72) Inventors: Junsup Lee, Seoul (KR); Jaebok Kim, Seoul (KR); Sangwon Seo, Seoul (KR); Bojun Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/109,778

(22) PCT Filed: Dec. 29, 2014

(86) PCT No.: PCT/KR2014/012970
§ 371 (c)(1),
(2) Date: Jul. 5, 2016

(87) PCT Pub. No.: WO2015/102338
PCT Pub. Date: Jul. 9, 2015

(65) Prior Publication Data
US 2016/0330327 A1 Nov. 10, 2016

Related U.S. Application Data

(60) Provisional application No. 61/924,222, filed on Jan. 6, 2014.

(51) Int. Cl.
*H04M 11/00* (2006.01)
*H04L 12/58* (2006.01)
(Continued)

(52) U.S. Cl.
CPC ......... *H04M 11/007* (2013.01); *H04L 12/12* (2013.01); *H04L 12/28* (2013.01); *H04L 51/18* (2013.01);
(Continued)

(58) Field of Classification Search
CPC ... H04L 65/1059; H04L 65/80; H04L 9/0877; H04L 2209/80; H04L 2209/805;
(Continued)

(56) References Cited

U.S. PATENT DOCUMENTS 8,761,712 B1 * 6/2014 Howard ................ G08C 17/02
340/12.22
9,372,922 B2 * 6/2016 Shaashua ............... G06F 16/35
(Continued)

*Primary Examiner* — Quan M Hua
(74) *Attorney, Agent, or Firm* — Birch, Stewart, Kolasch & Birch, LLP

(57) ABSTRACT

Disclosed are a mobile terminal and a control method therefore. The control method of the mobile terminal, according to one embodiment of the present invention, comprises the steps of executing a mobile messenger, selecting a specific other user pre-registered in the mobile messenger, receiving a first command which is for the selected specific other user as a recipient; controlling the state of the at least one device according to the received first command; and controlling the controlled state of the at least one device to be maintained or to be changed according to whether the first command and a second command are in conflict with each other when the second command which is for the specific other user as a recipient is received through another mobile terminal in which the mobile messenger is executed.

15 Claims, 65 Drawing Sheets

(51) Int. Cl.
*H04L 12/12* (2006.01)
*H04L 29/08* (2006.01)
*H04L 12/28* (2006.01)
*H04M 1/72412* (2021.01)
*H04M 1/72415* (2021.01)
*H04M 1/72436* (2021.01)
*H04W 4/12* (2009.01)
*H04W 88/02* (2009.01)

(52) U.S. Cl.
CPC ............ *H04L 67/12* (2013.01); *H04L 67/125* (2013.01); *H04M 1/72412* (2021.01); *H04M 1/72415* (2021.01); *H04M 1/72436* (2021.01); *H04W 4/12* (2013.01); *H04W 88/02* (2013.01)

(58) Field of Classification Search
CPC . H04L 63/061; H04L 12/2803; H04L 63/102; H04L 67/303; H04L 67/306; H04L 2012/2841; H04L 41/0893; H04L 63/18; H04L 67/16; H04N 21/43615; H04N 21/64322; H04W 4/70; H04W 4/80; H04W 76/10; H04W 84/12; H04W 12/04; H04W 4/38; H04W 84/18; H04W 12/02; G06F 2203/0384; G06F 3/002; G06F 3/0484; G06F 13/10; G06F 13/12

See application file for complete search history.

(56) References Cited

U.S. PATENT DOCUMENTS

| | | |
|---|---|---|
| 2003/0105854 A1 | 6/2003 | Thorsteinsson et al. |
| 2005/0240672 A1 | 10/2005 | Chen et al. |
| 2007/0032225 A1 | 2/2007 | Konicek et al. |
| 2008/0096594 A1 | 4/2008 | Vinding |
| 2008/0098417 A1* | 4/2008 | Hatamian ............ H04H 60/33 725/24 |
| 2010/0095332 A1* | 4/2010 | Gran ................ G06F 17/30038 725/93 |
| 2010/0153576 A1* | 6/2010 | Wohlert ........... H04N 21/43615 709/231 |
| 2013/0090773 A1* | 4/2013 | Park ...................... H04L 12/12 700/286 |
| 2013/0289770 A1 | 10/2013 | Rawls-Meehan |
| 2015/0067080 A1* | 3/2015 | Cho ..................... H04L 67/025 709/206 |
| 2016/0316363 A1* | 10/2016 | Li ....................... H04L 12/2809 |

\* cited by examiner

FIG. 46
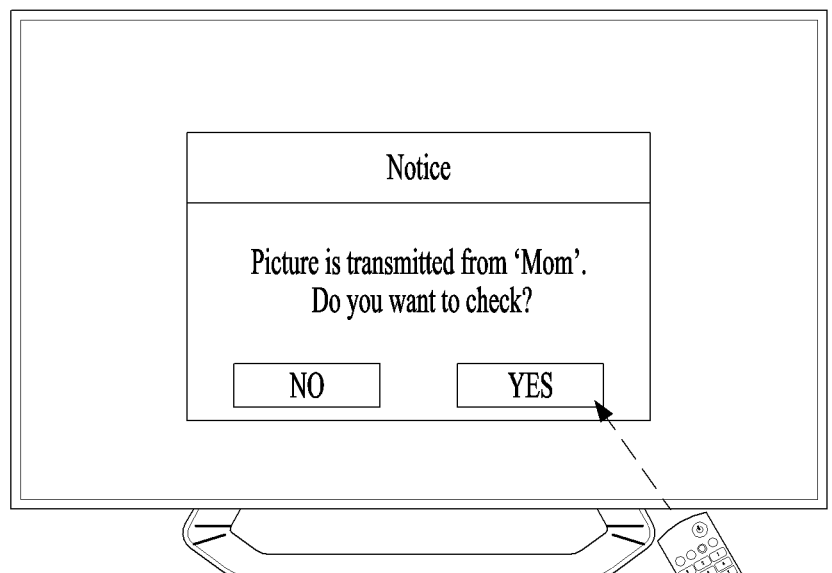
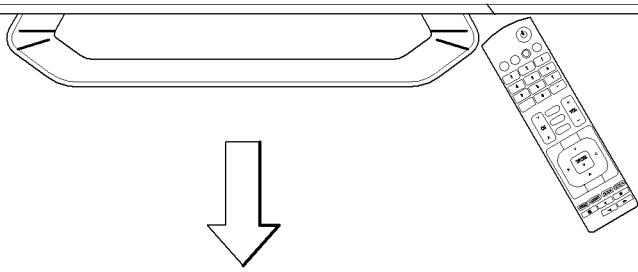

FIG. 50

| Trgger | Action |
|---|---|
| When user continuously changes channel | recommend broadcast App preferred by user |
| when phone call is received | execute TV sound muting |
| when oven operation is completed | display pop-up on TV |
| . . . | . . . |

FIG. 58

 SMS, E-Mail

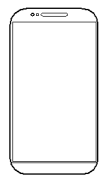
Sunny

Title: Re: invitation
Recipient: Yoona

Yoona~ happy birthday~ It's your birthday, I absolutely go, see you on Friday.

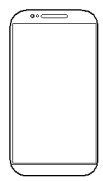
Soyeon

Title: Re: invitation
Recipient: Yoona

O.K. I will go.

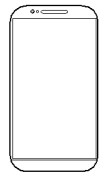
Seungmi

Title: Re: invitation
Recipient: Yoona

I have an appointment. I can't go, sorry,

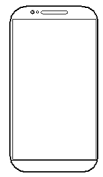
Eunhee

Title: Re: invitation
Recipient: Yoona

Yoona~ happy birthday~ It's your birthday, I absolutely go, see you on Friday

----- Original Message -----

Title: invitation
Recipient: Sunny, Soyeon, Seungmi, Eunhee
Invite to birthday party of Yoona
Date: this Friday (Oct. 24, 7 P.M.)
Location: Yoona's house

FIG. 59

Egg, scallion, and onion are in refrigerator. Oven recommends Japchae dish recipe suitable for birthday party, air conditioner is running at 7 o?clock on this Friday

FIG. 64 turn off air conditioner going out mode of boiler

MOBILE TERMINAL AND CONTROL METHOD THEREFOR

CROSS REFERENCE TO RELATED APPLICATIONS

This application is the National Phase of PCT International Application No. PCT/KR2014/012970, filed on Dec. 29, 2014, which claims priority under 35 U.S.C. 119(e) to U.S. Provisional Application No. 61/924,222, filed on Jan. 6, 2014, all of which are hereby incorporated by reference into the present application.

TECHNICAL FIELD

The present invention relates to a mobile terminal and a method of controlling therefor. For example, the present invention can be applied to technological environment for controlling a plurality of devices connected with each other by a network such as Internet of Thing (IoT), and the like.

BACKGROUND ART

A terminal can be classified into a mobile/portable terminal and a stationary terminal in accordance with whether the terminal is capable of being moved. Again, the mobile terminal can be divided into a handheld (type) terminal and a vehicle mounted terminal.

A function of a mobile terminal is diversifying. For instance, the function of the mobile terminal includes such a function as data and audio communication, capturing a picture and a video using a camera, audio recording, playing a music file using a speaker system and outputting an image or a video on a display unit. Some of the terminals may have an additional function such as playing an electronic game or perform a function of a multimedia player. In particular, a latest mobile terminal can receive a multicast signal providing such visual contents as a broadcast, a video and a television program.

As the function of the terminal is diversified, the terminal is implemented in a form of a multimedia player equipped with multiple functions such as capturing a picture or a video, playing a music file or a video file, playing a game, receiving a broadcast and the like.

In order to support and increase the function of the terminal, it may consider improving a structural part and/or a software part of the terminal.

Recently, solutions for controlling a plurality of external devices using a mobile device in a home network or IoT (Internet of Thing) environment are developing.

DISCLOSURE OF THE INVENTION

Technical Tasks

One embodiment of the present invention intends to provide a solution for more easily and promptly controlling a plurality of external devices connected with each other by a network (e.g., IoT) using a mobile messenger.

Another embodiment of the present invention intends to solve a problem which is expected when two commands in conflict are received on a mobile messenger.

The other embodiment of the present invention intends to propose a technology of automatically extracting external device control items preferred by a user in a manner of analyzing conversation contents of a mobile messenger.

Technical Solution

To achieve these and other advantages and in accordance with the purpose of the present invention, as embodied and broadly described, according to one embodiment, a method of controlling a mobile terminal includes the steps of executing a mobile messenger, selecting a specific counterpart registered at the mobile messenger in advance, receiving a first command by designating the selected specific counterpart as a recipient, controlling a status of at least one or more devices according to the received first command and, if a second command is received by designating the specific counterpart as a recipient via a different mobile terminal in which the mobile messenger is executed, controlling the controlled status of the at least one or more devices to be maintained or changed according to whether or not the first command and the second command are in conflict with each other.

To further achieve these and other advantages and in accordance with the purpose of the present invention, according to a different embodiment, a mobile terminal includes an application manager configured to execute a mobile messenger, a touch interface module configured to select at least one or more users registered at the mobile messenger in advance, a display module configured to display conversation contents with the at least one or more selected users, and a controller configured to determine a specific device as a control target among at least one or more devices connected with the mobile terminal by a network, the controller configured to control a specific function among at least one or more functions of the specific device corresponding to the control target to be executed according to the displayed conversation contents.

Advantageous Effects

According to one embodiment of the present invention, it is able to provide a solution for more easily and promptly controlling a plurality of external devices connected with each other by a network (e.g., IoT) using a mobile messenger.

According to another embodiment of the present invention, it is able to solve a problem which is expected when two commands in conflict are received on a mobile messenger.

According to the other embodiment of the present invention, it is able to provide a technology of automatically extracting external device control items preferred by a user in a manner of analyzing conversation contents of a mobile messenger.

DESCRIPTION OF DRAWINGS

FIGS. 44 to 46 are diagrams for a process of transmitting a specific picture file using a mobile messenger;

FIG. 50 is a diagram for a database to which a specific command (trigger) and an action of an external device corresponding to the specific command (trigger) are mapped according to one embodiment of the present invention;

FIGS. 58 and 59 are diagrams for a different embodiment of automatically entering a mode preferred by a user using a mobile messenger;

FIGS. 63 to 65 are diagrams for a further different embodiment of automatically entering a mode preferred by a user using a mobile messenger.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
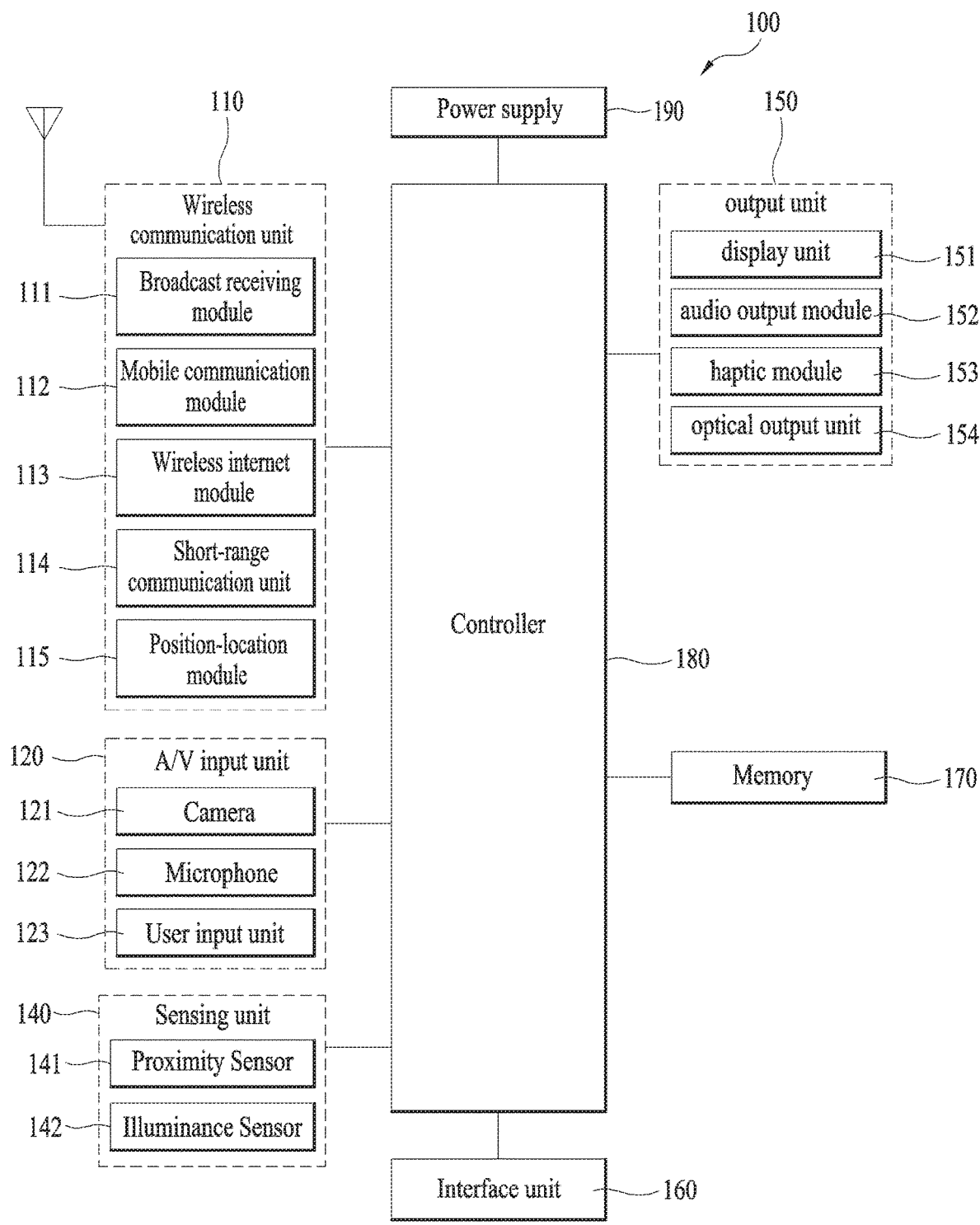
FIG. 1A is a block diagram of a mobile terminal in accordance with the present disclosure.
Figure 1B:
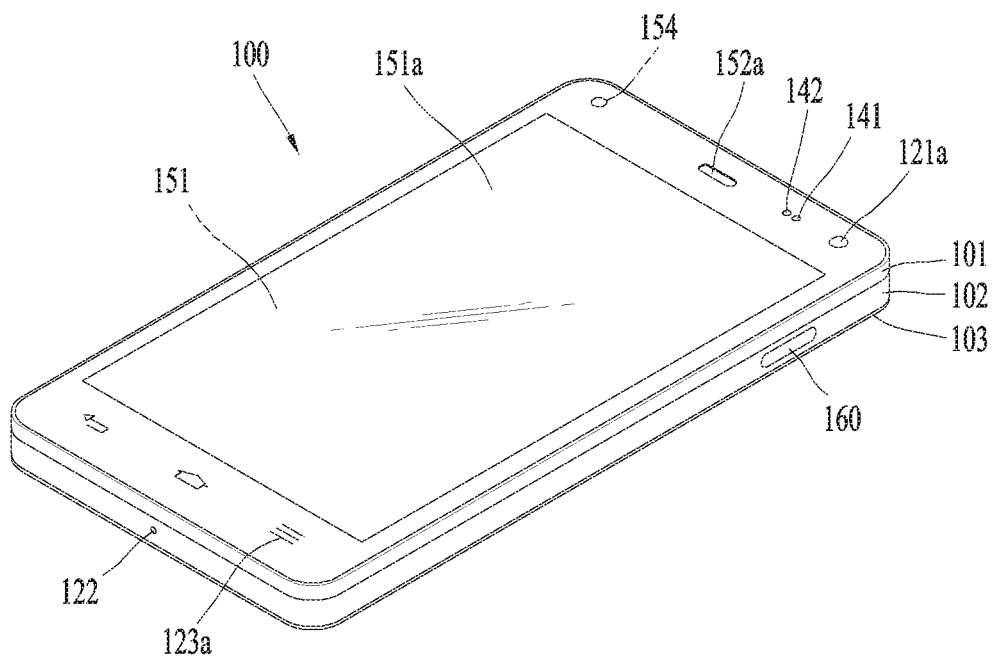
FIGS. 1B and 1C are conceptual views of one example of the mobile terminal, viewed from different directions.
Figure 1C:
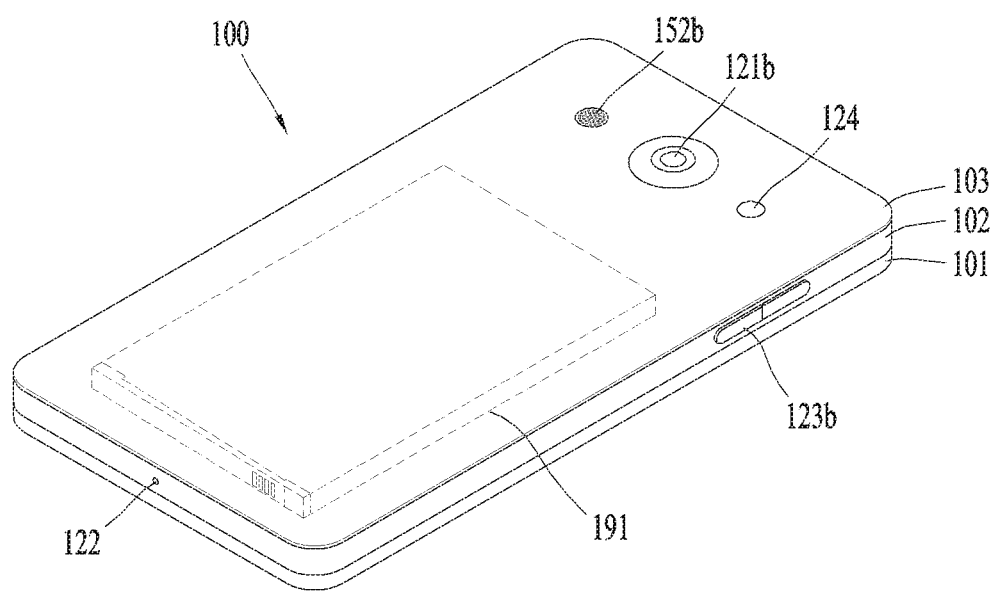

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some elements of the above-discussed elements perform together with the other elements in order to perform following various embodiments of the mobile device. Furthermore, the mobile device can perform based on at least one OS program stored in the memory (170).

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

If desired, the mobile terminal 100 may include the display unit (151), the first and second audio output modules (152*a*, 152*b*), the proximity sensor (141), the illumination sensor (142), the optical output module (154), the first and second cameras (121a, 121b), the first and second manipulation units (123a and 123b), the microphone (122), the interface unit (160) and so on.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The above discussed mobile terminal can be applied to a flexible display. The flexible display will be described in next drawings.

Figure 2:
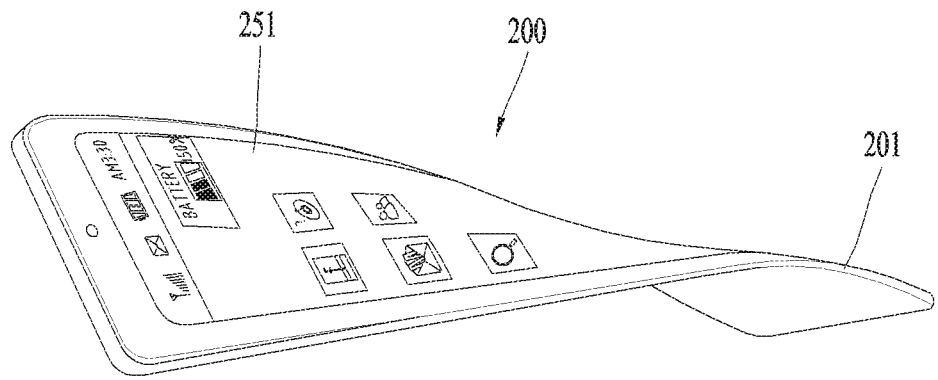
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
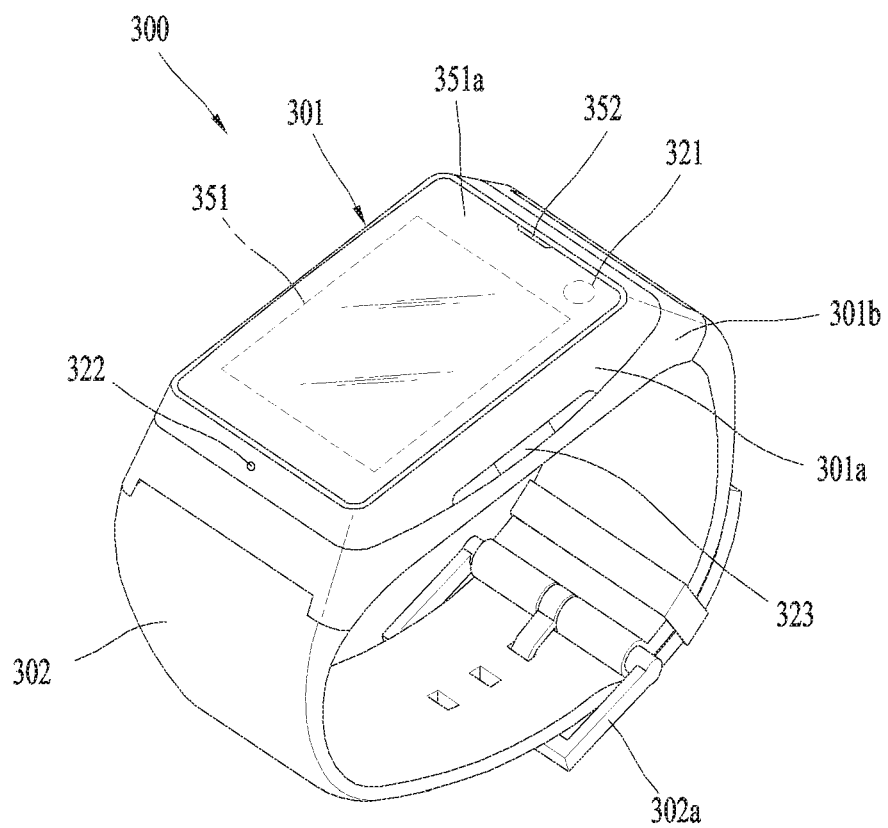
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
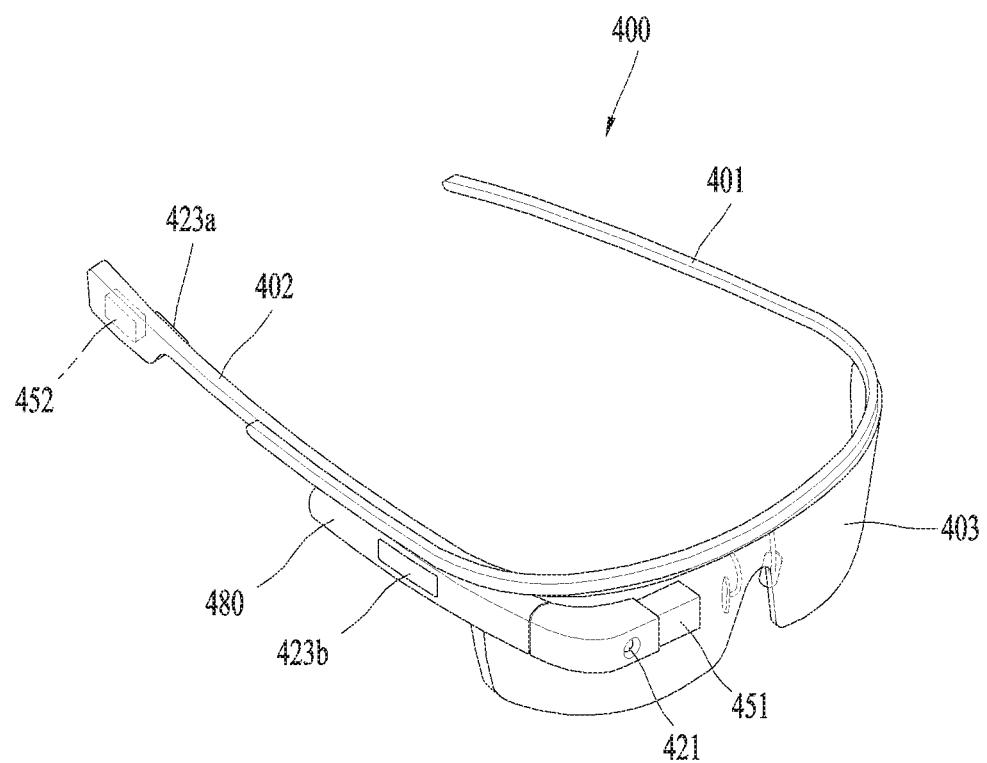
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances.

A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5:
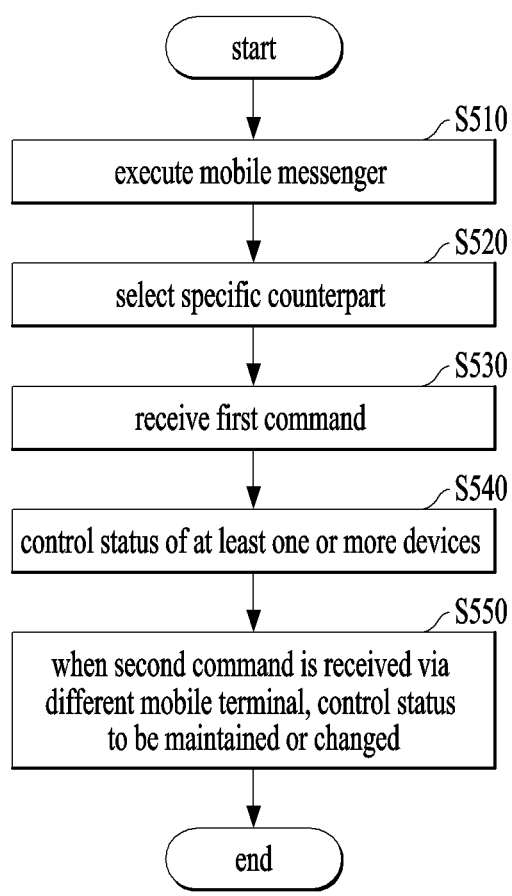
FIG. 5 is a flowchart for a method of controlling a mobile terminal according to one embodiment of the present invention.

FIG. 5 is a flowchart for a method of controlling a mobile terminal according to one embodiment of the present invention. Referring to FIG. 5, when an external device connected by a network (e.g., IoT) is controlled using a mobile messenger, two or more commands are in conflict with each other and it is difficult to determine a command for controlling the external device. The present invention intends to solve the problem above.

As shown in FIG. 5, a mobile terminal according to one embodiment of the present invention executes a mobile messenger [S510] and selects a specific counterpart registered at the mobile messenger in advance [S520].

If a first command for making the selected specific counterpart as a recipient is received [S530], the mobile terminal controls status of at least one or more devices according to the received first command [S540].

Subsequently, if a second command for making the specific counterpart as a recipient is received via a different mobile terminal in which the mobile messenger is executed, the mobile terminal controls the controlled status of the at least one or more devices to be maintained or changed according to whether the first command and the second command are in conflict with each other [S550].

According to a different embodiment of the present invention, in the step S550, it is able to consider as collision has occurred only when a difference between time of receiving the first command and time of receiving the second command is equal to or greater than a predetermined time interval.

According to a further different embodiment of the present invention, in the step S550, it is able to determine whether or not collision occurs according to a position of a mobile terminal of the first command and a position of a different mobile terminal of the second command.

For example, the specific counterpart corresponds to at least one or more devices capable of being controlled by the mobile terminal and the at least one or more devices connected with each other by a network. In particular, the specific counterpart is differentiated from a normal user on a mobile messenger.

Although it is not depicted in FIG. 5, when the first command and the second command are in conflict with each other, an option for asking whether to maintain a current status of a device according to the first command or whether to change the current status of the device according to the second command is displayed. For example, the option is outputted in a vote form.

Moreover, when the first command and the second command are in conflict with each other, to design a step of automatically executing a group chatting including the different mobile terminal also belongs to the scope of the present invention. To design a step of analyzing a text included in the automatically executed group chatting and a step of controlling the status of the controlled at least one or more devices to be maintained or changed also belongs to the scope of the present invention.

For example, the step S520 and the step S530 are performed via a touch interface or a voice interface.

The mobile terminal mentioned earlier in FIG. 5, for example, corresponds to a cellular phone, a tablet PC, or a laptop (notebook). Moreover, the mobile terminal may corresponds to a smart glass or a smart watch mentioned earlier in previous drawings.

The embodiment mentioned earlier in FIG. 5 is explained in more detail with reference to FIGS. 51 to 55 and a mobile messenger described in the present invention is explained in more detail with reference to FIGS. 7 to 50 in the following.

Figure 6:
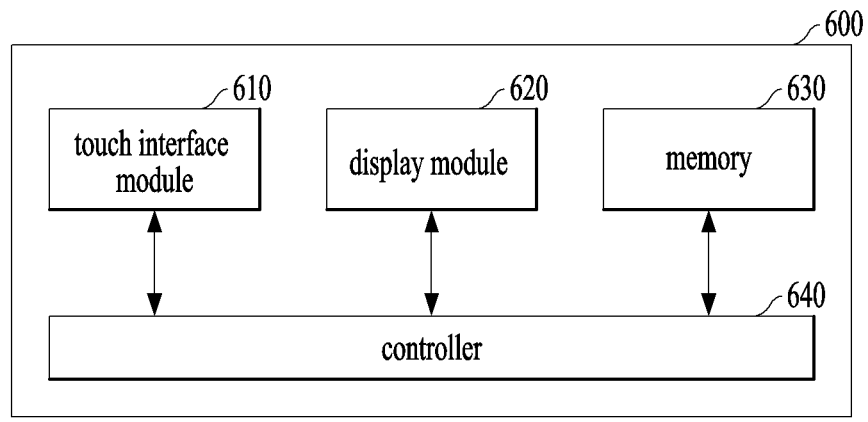
FIG. 6 is a block diagram for main configuration elements of a mobile terminal according to one embodiment of the present invention.

FIG. 6 is a block diagram for main configuration elements of a mobile terminal according to one embodiment of the present invention. In FIG. 6, a technology for automatically setting up a specific function only of a specific external device by analyzing conversation contents with a normal user on a mobile messenger is explained.

As shown in FIG. 6, a mobile terminal 600 according to one embodiment of the present invention includes a touch interface module 610, a display module 620, a memory 630 and a controller 640.

The controller 640 executes a mobile messenger. Of course, a configuration element in charge of the function can also be referred to as an application manager.

The touch interface module 610 selects at least one or more users registered at the mobile messenger in advance and the display modules 620 displays conversation contents with the selected at least one or more users.

The controller 640 selects a specific device as a control target from among at least one or more devices connected with the mobile device 600 by a network according to the displayed conversation contents and controls a specific function among at least one or more functions of the specific device becoming the control target to be executed.

The controller 640 analyzes the displayed conversation contents and controls at least one or more keywords, which are extracted according to a result of the analyzed contents, to be outputted. Or, the controller 640 may set a limit on an analysis range of the conversation contents on the basis of time.

And, the controller 640 may set a limit on an analysis range of the conversation contents according to a selection of a user recognized by the touch interface module 610. This also belongs to the scope of the present invention.

The memory 630 stores a specific device corresponding to the extracted keyword and data to which each function of the specific device is mapped in advance. Of course, a user is able to change, add or delete the data. Regarding this, it shall be described with reference to FIG. 50 in the following.

The embodiment mentioned earlier in FIG. 6 is explained in more detail with reference to FIGS. 56 to 65 and a mobile messenger described in the present invention is explained in more detail with reference to FIGS. 7 to 50 in the following.

FIGS. 7 to 13 are diagrams of a process for a mobile terminal to register a mobile messenger to control a different external device according to one embodiment of the present invention.

The present invention relates to a technology capable of controlling a mobile device, a TV, a laundry machine, a refrigerator, a cleaner, a coffee machine, a smart bulb and the like at a time using a mobile messenger. The devices are connected with each other by a network (e.g., Internet, etc.) and the environment is referred to as Internet of Thing (IoT).

Moreover, the IoT may correspond to an infra (structure of control) in which at least two or more devices (home appliances, a car, furniture, a bulb and the like) are connected with each other via the Internet and information is exchanged between things or between devices.

Figure 7:
FIGS. 7 to 13 are diagrams of a process for a mobile terminal to register a mobile messenger to control a different external device according to one embodiment of the present invention.

As shown in FIG. 7, in order to transceive a command with a plurality of devices via a conversation form, it is necessary to have a process of initially registering a specific counterpart. The specific counterpart can be referred to as M2. The M2 not only corresponds to a general mobile terminal but also corresponds to a plurality of devices capable of transmitting and receiving a control command via a mobile terminal. For example, if conversation content capable of controlling a refrigerator, a laundry machine, a bulb and the like is typed on the M2 counterpart, a specific function of at least one selected from the refrigerator, the laundry machine and the bulb is immediately executed. Hence, it is necessary to perform a process of initially adding a counterpart such as M2 shown in FIG. 7.

Figure 8:
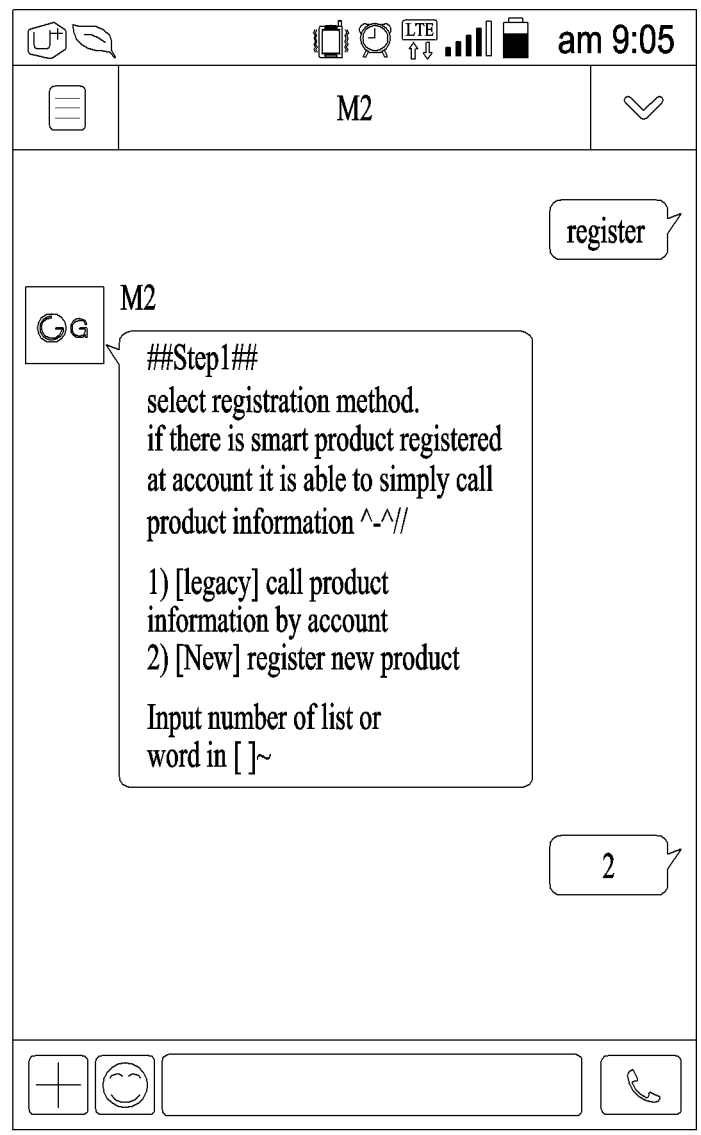
Figure 9:
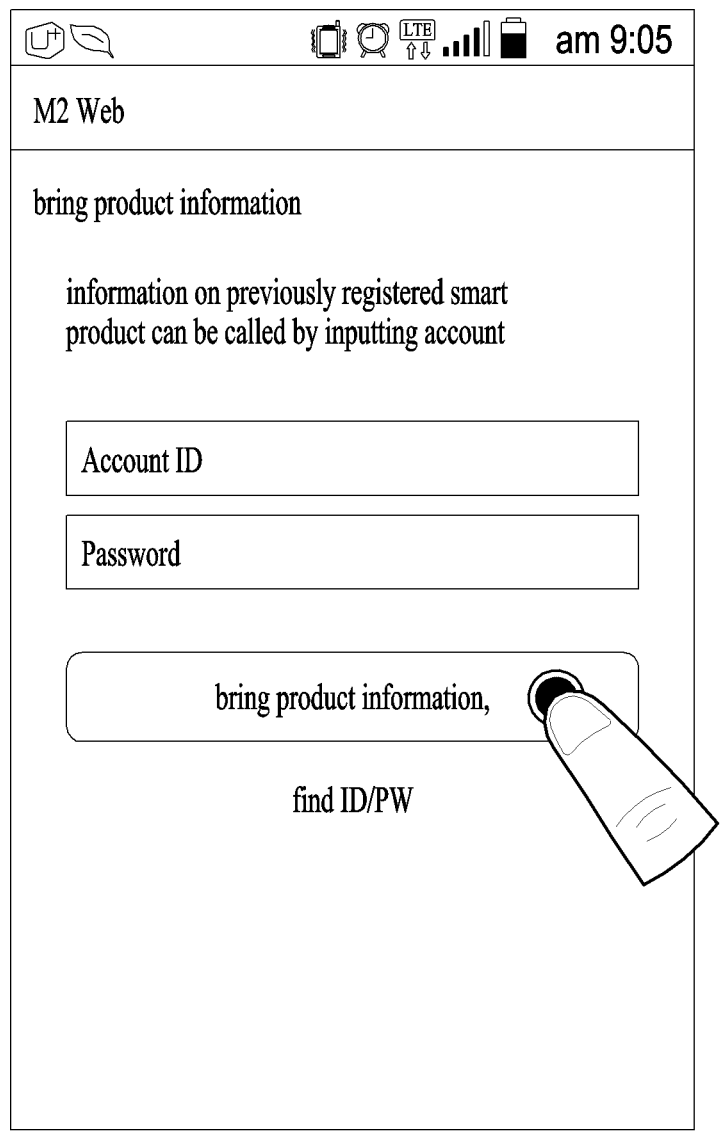
Figure 10:
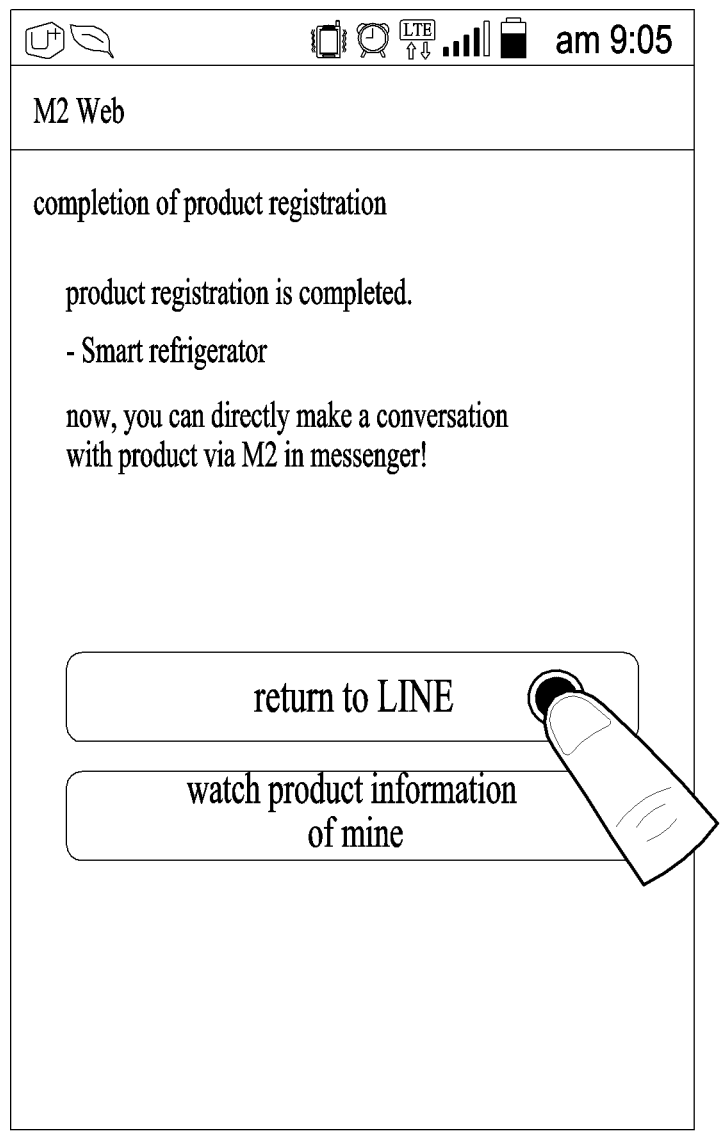

After the counterpart such as M2 is added as a messenger counterpart, if such a letter as "register" is inputted, as shown in FIG. 8, a menu screen for inputting basic information on a device to be controlled is displayed Moreover, as shown in FIG. 9, if login information is inputted, as shown in FIG. 10, information on a previously registered specific device (e.g., LG Smart refrigerator) is displayed. The specific device corresponds to an example of a device capable of performing IoT.

Figure 11:
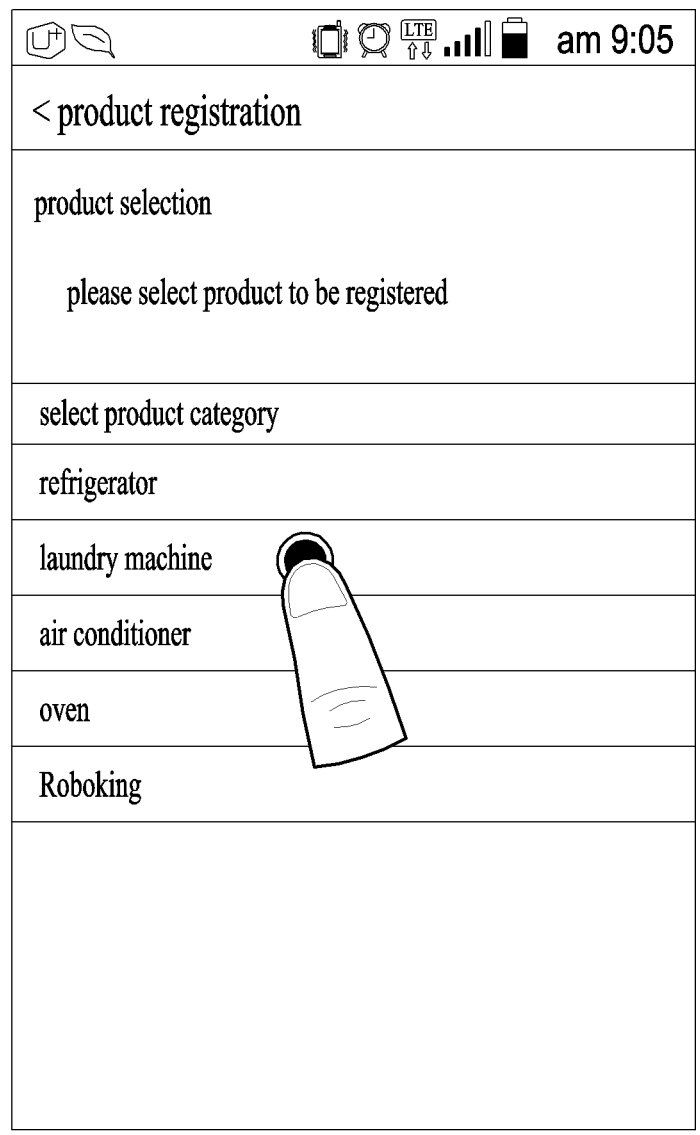
Figure 12:
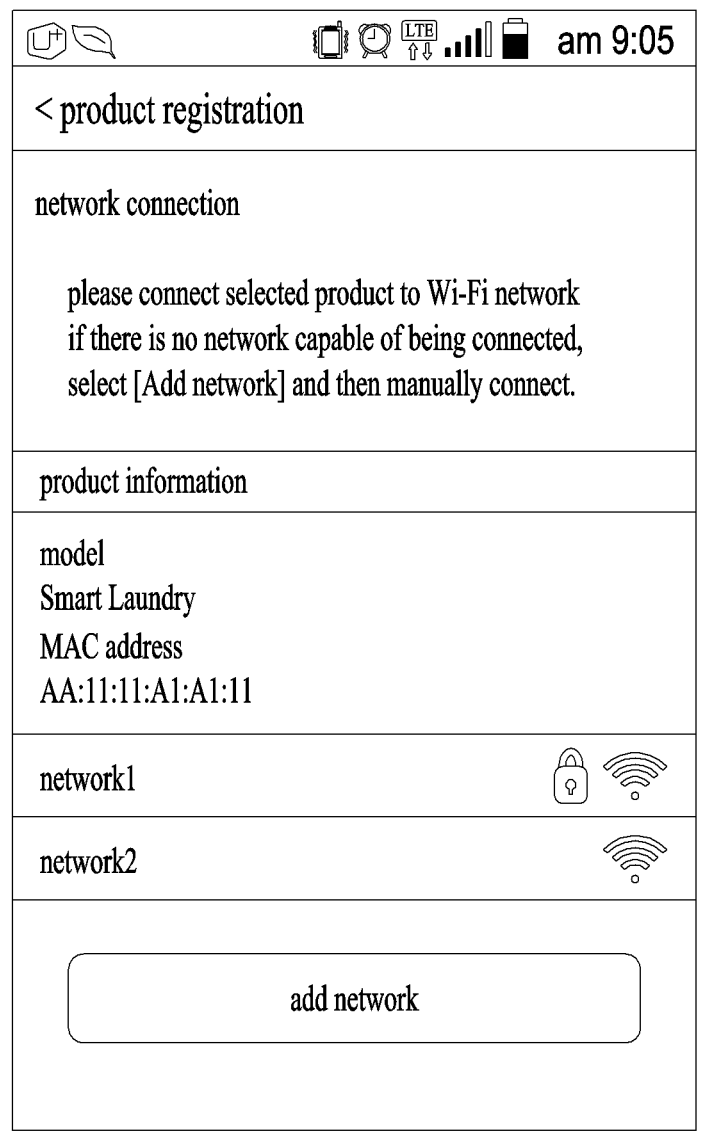

Or, as shown in FIG. 11, a user can directly input detail information on a specific device. In particular, as shown in FIG. 11, a user preferentially inputs category information of a device to be controlled. And, as shown in FIG. 12, the user inputs network information used by a selected device. For example, it may be able to configure a mobile terminal according to one embodiment of the present invention and a device to be controlled to use an identical WiFi network. Of course, to configure a different WiFi network also belongs to the scope of the present invention.

Figure 13:
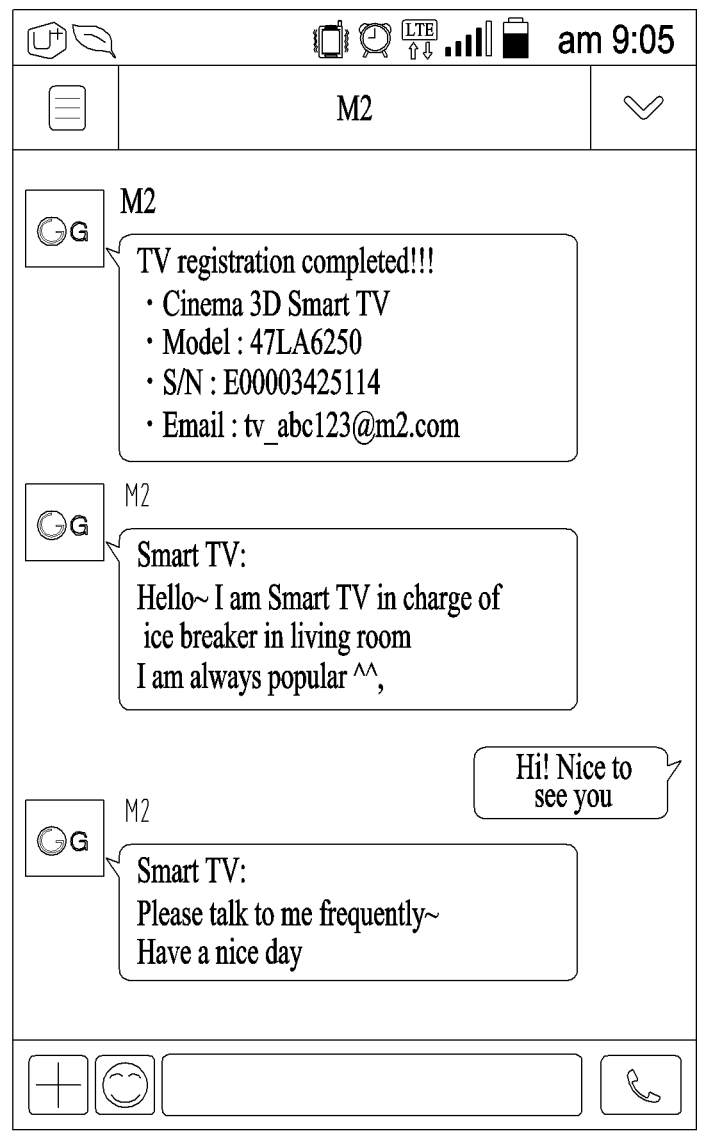

If the processes shown in FIGS. 7 to 12 are all completed, as shown in FIG. 13, basic information on a specific device to be controlled is displayed. Hence, a user can control a laundry machine shown in FIG. 13 while using a mobile messenger of a mobile terminal by designating the M2 as a counterpart. As mentioned in the foregoing description, since it is able to design not only a laundry machine but also a plurality of devices to be mapped to the M2 counterpart, it is not necessary for a user to register a laundry machine, a refrigerator, a bulb and the like as a separate counterpart.

FIGS. 14 to 17 are diagrams for an example of a process for a mobile terminal to propose a specific mode for controlling an external device by analyzing contents inputted via a mobile messenger according to one embodiment of the present invention.

Figure 14:
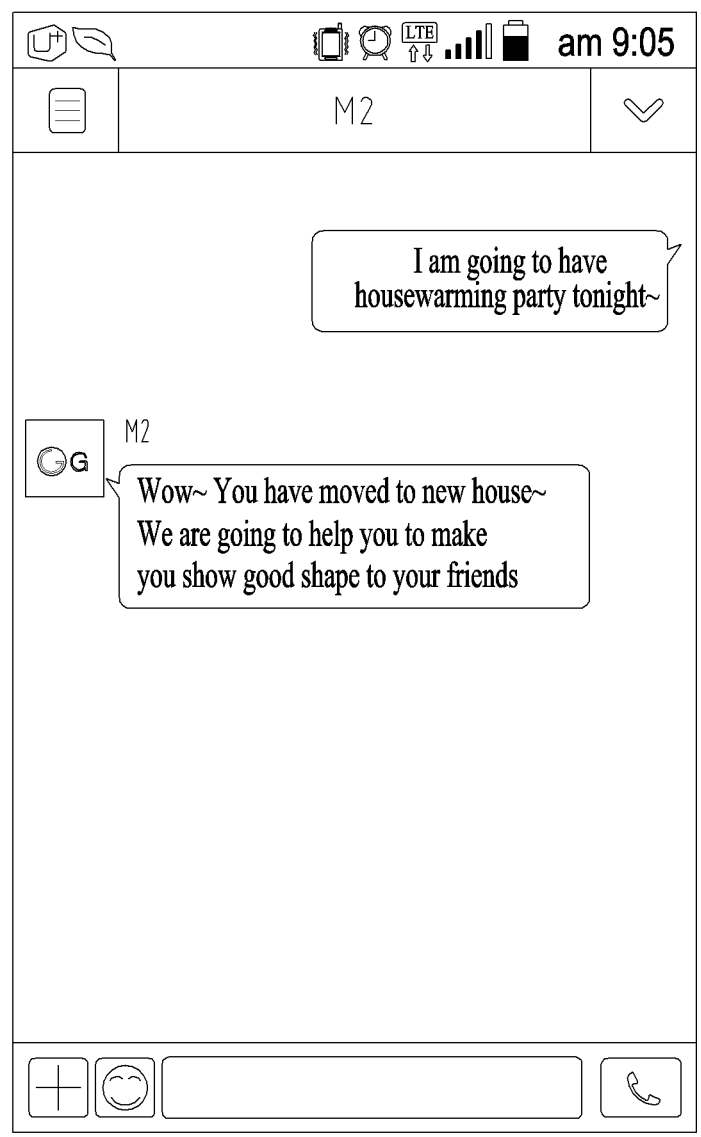
FIGS. 14 to 17 are diagrams for an example of a process for a mobile terminal to propose a specific mode for controlling an external device by analyzing contents inputted via a mobile messenger according to one embodiment of the present invention.
Figure 15:
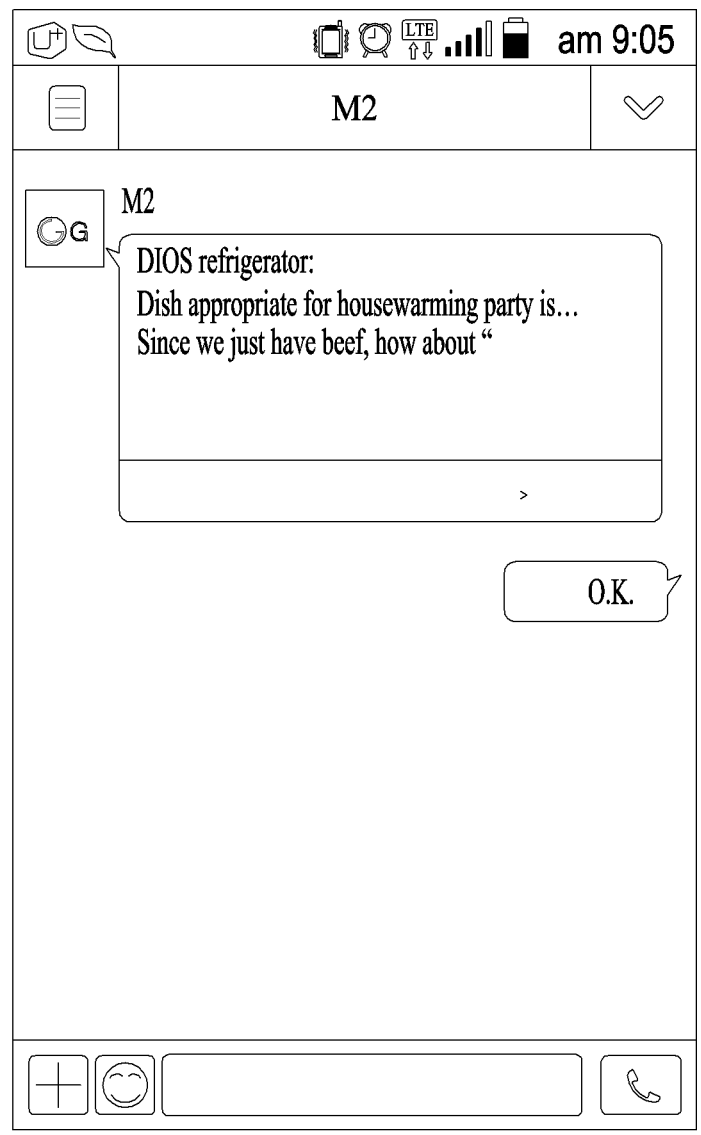

As shown in FIG. 14, a mobile terminal according to one embodiment of the present invention executes a mobile messenger and inputs conversation contents on a specific event by designating M2 as a counterpart. As shown in FIG. 15, the mobile terminal outputs current status information of a refrigerator registered in advance and a message varying depending on the inputted contents on the specific event.

Figure 16:
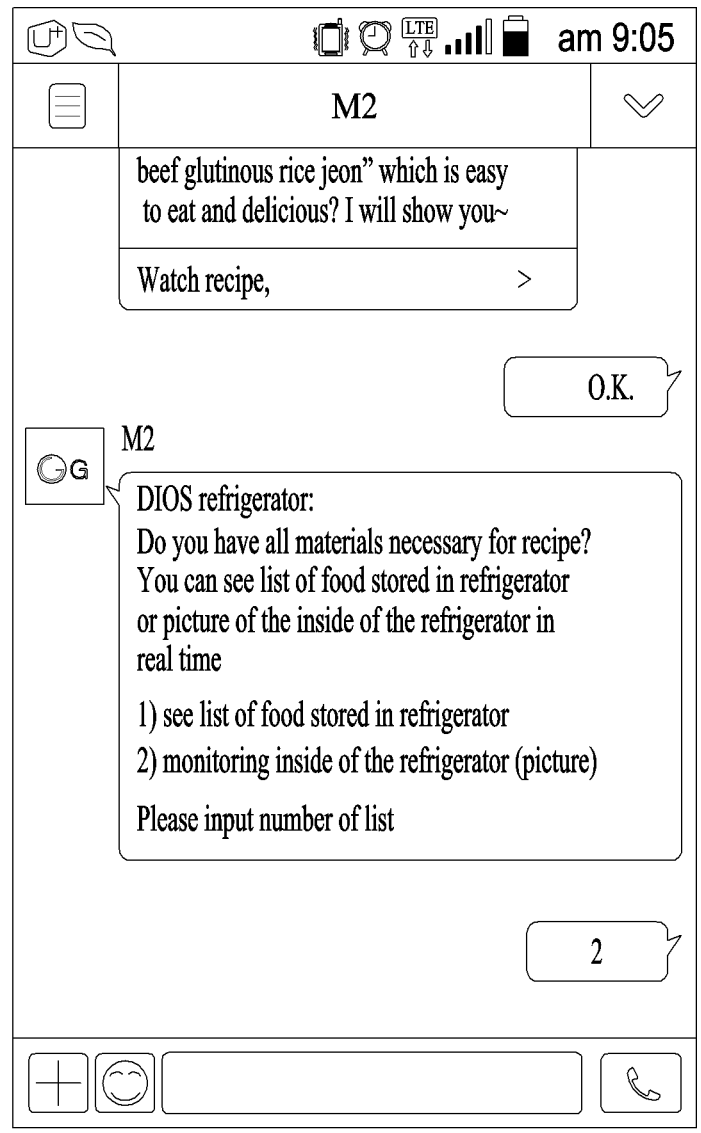
Figure 17:
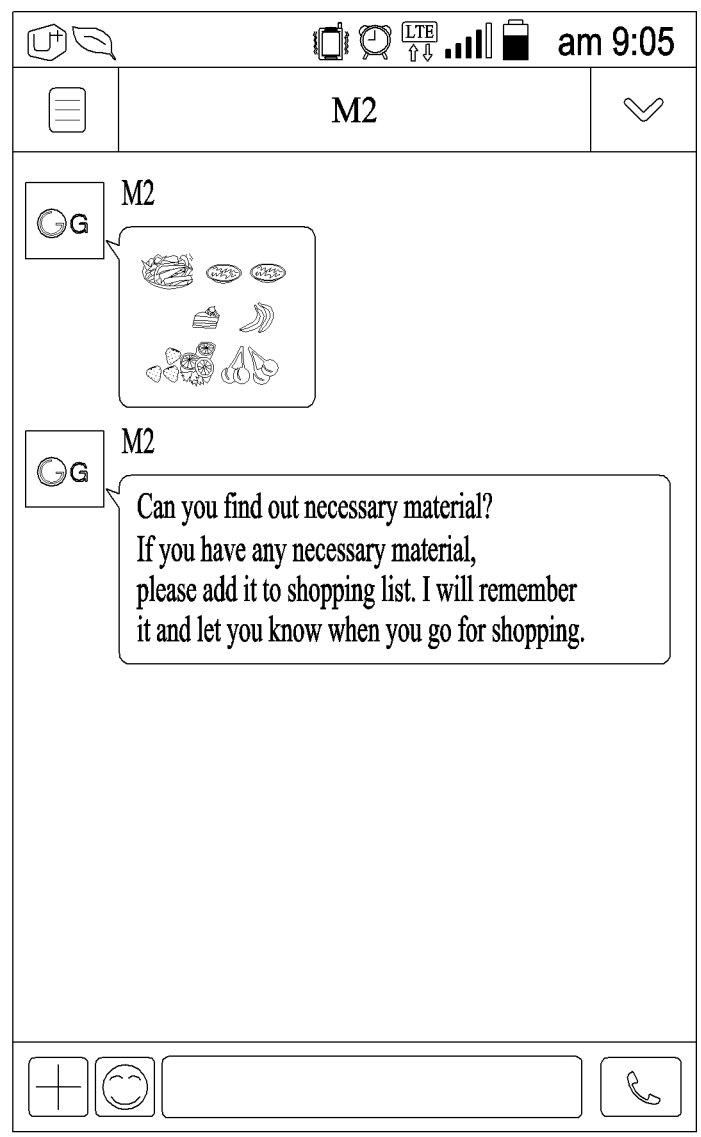

For example, as shown in FIG. 16, a list of food stored in refrigerator or an option capable of showing a picture of the inside of the refrigerator is displayed. In particular, as shown in FIG. 17, after a user checks the picture of the inside of the refrigerator, the user can automatically add information on required food materials to a shopping list. For example, if the user selects a recipe of a specific dish, information on materials not existing in the refrigerator is added to the shopping list only among the materials required for the specific dish.

Meanwhile, although a refrigerator is shown in the previous drawings as an example, it is able to display a recommendation list of other required devices together in response to an inputted specific event (such a terminology as "housewarming" in FIG. 14). For example, a first function (water cleaning) of a first device (cleaner), a second function (air cleaning) of a second device (air conditioner), a third function (slideshow of pictures) of a third device (TV) and the like required for the housewarming can be designed to be stored in a memory in advance to make the functions to be mapped to such a terminology as "housewarming". The memory may correspond to a memory installed in the inside of the mobile terminal or a DB of an external server.

Figure 18:
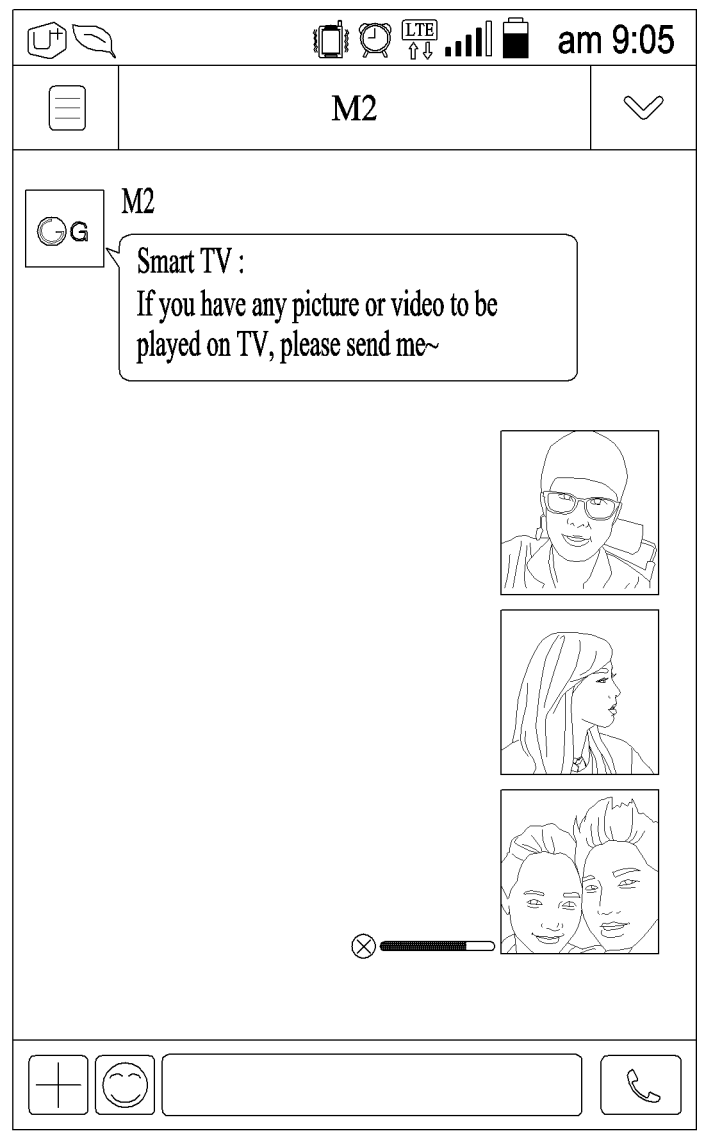
FIGS. 18 and 19 are diagrams of a process for a mobile terminal to share a picture file with a different external device according to one embodiment of the present invention.
Figure 19:
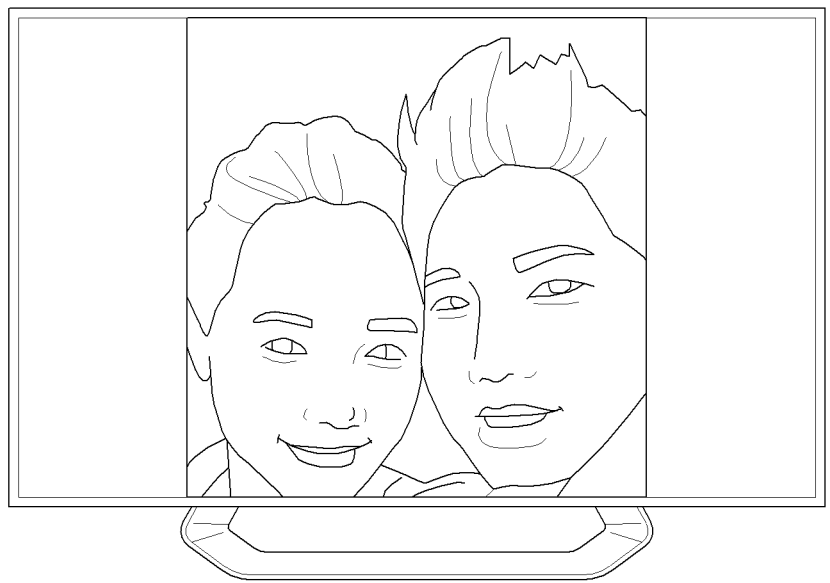

FIGS. 18 and 19 are diagrams of a process for a mobile terminal to share a picture file with a different external device according to one embodiment of the present invention.

As shown in FIG. 18, a user inputs such a text as "picture sharing" by designating M2 as a counterpart on a mobile messenger. In particular, although a text for identifying a command for a TV is not inputted, as shown in FIG. 18, a smart TV responds to the text and displays a message for asking transmission of a picture or a video. Of course, a user can make a tablet PC respond to the text such as "picture sharing" instead of the smart TV. This also belongs to the scope of the present invention.

Moreover, as shown in FIG. 18, if a specific picture is inputted on a mobile messenger, as shown in FIG. 19, the inputted specific picture is outputted on the TV instead of the mobile terminal. In this case, according to one embodiment of the present invention, a plurality of transmitted pictures can be automatically executed in a slideshow form. By doing so, it is able to minimize user action.

Figure 20:
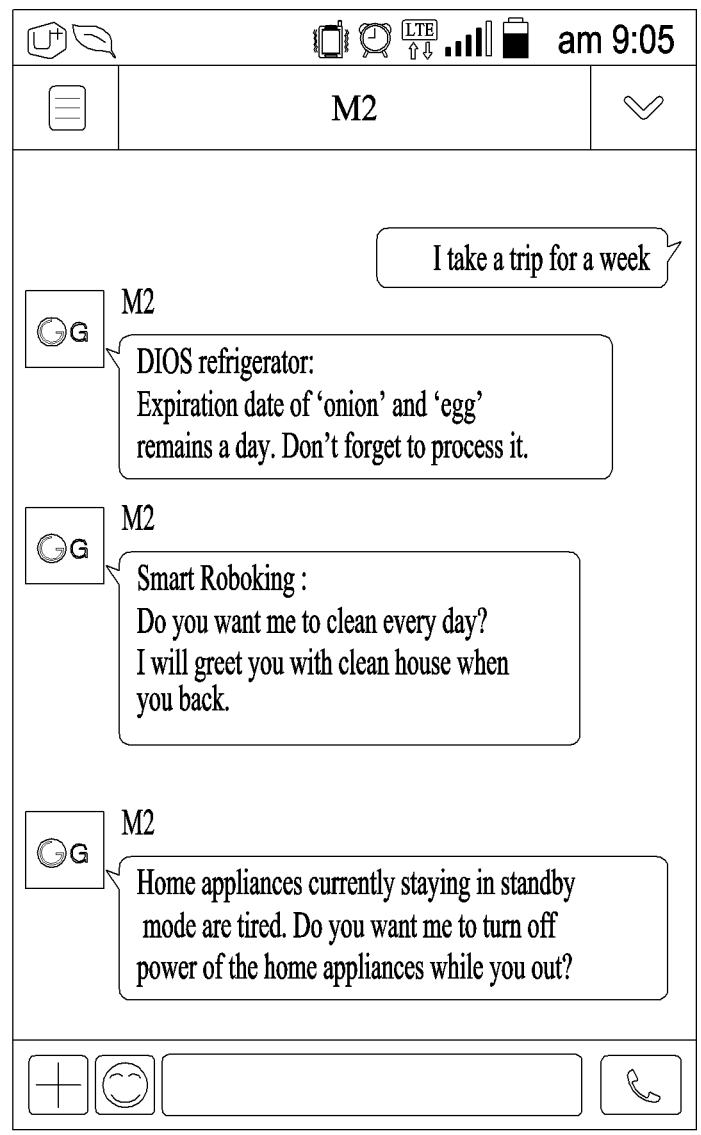
FIGS. 20 to 22 are diagrams for a different example of a process for a mobile terminal to propose a specific mode for controlling an external device by analyzing contents inputted via a mobile messenger according to one embodiment of the present invention.
Figure 21:
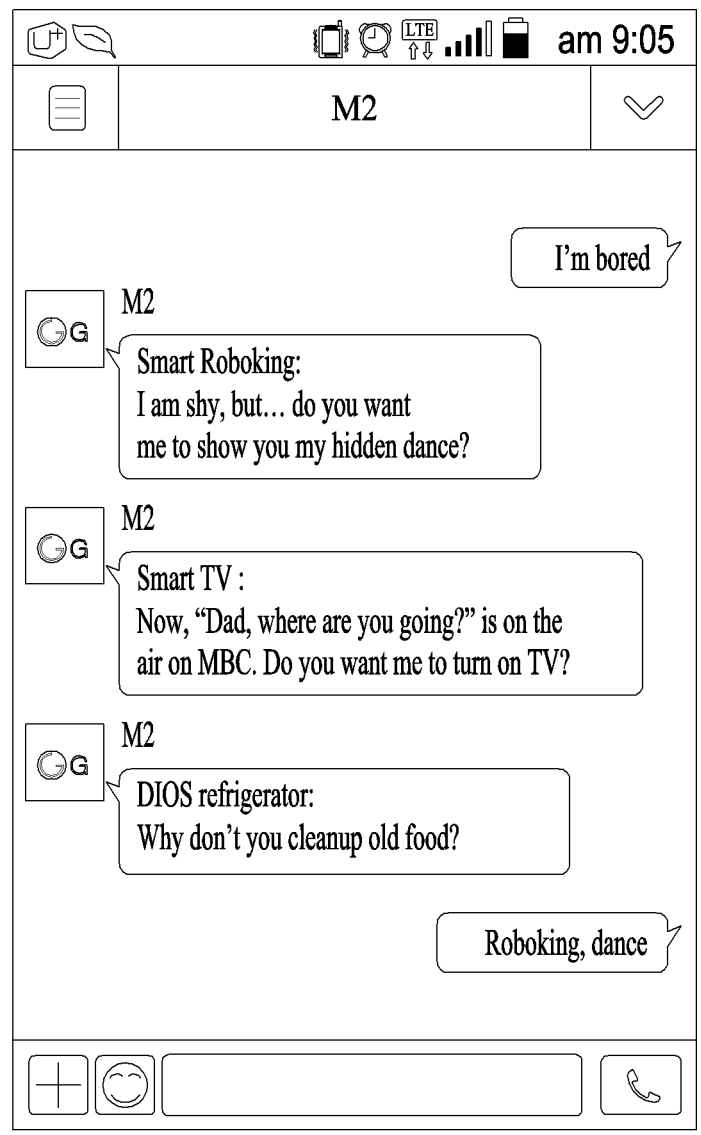
Figure 22:
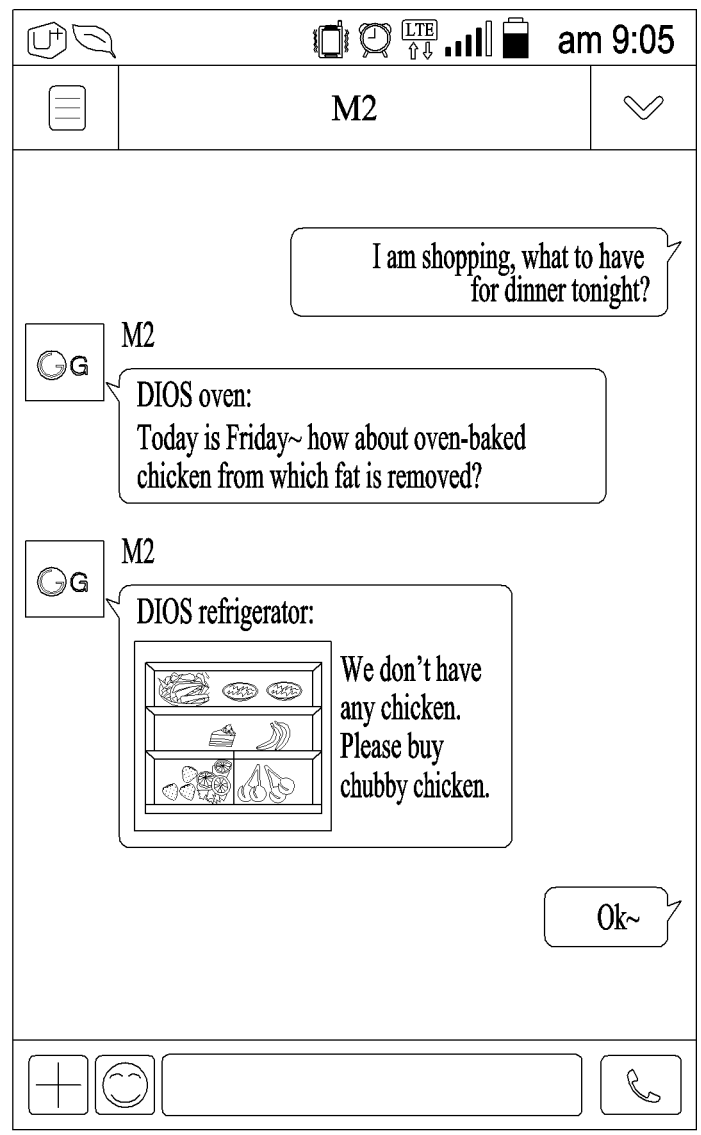

FIGS. 20 to 22 are diagrams for a different example of a process for a mobile terminal to propose a specific mode for controlling an external device by analyzing contents inputted via a mobile messenger according to one embodiment of the present invention.

As shown in FIG. 20, a user executes a mobile messenger of a mobile terminal according to one embodiment of the present invention and simply inputs such a command as "I take a trip for a week" by designating M2 as a counterpart. As mentioned in the foregoing description, the M2 described in the present specification does not simply mean mobile terminals of other persons but mean a virtual counterpart for controlling devices at home connected with each other by such a network as IoT and the like. Of course, counterparts corresponding to a plurality of devices registered in advance via the processes mentioned earlier in FIGS. 7 to 13 are referred to as the M2.

Meanwhile, as shown in FIG. 20, such an inputted word as a trip for a week can be estimated as a meaning that a user go out for a long time. Hence, a refrigerator mapped to the M2 outputs a message for guiding an expiration date of food and a cleaner (e.g., Roboking) mapped to the M2 outputs a message capable of making a reservation for regular cleaning and outputs a message for inquiring whether to turn off power of all other devices mapped to the M2.

Meanwhile, as shown in FIG. 21, a user executes a mobile messenger of a mobile terminal according to one embodiment of the present invention and simply inputs such a command as "I am bored" by designating M2 as a counterpart.

In this case, as shown in FIG. 21, a message for recommending a specific function of a specific device is outputted in response to the inputted word "bored". For example, Roboking (product name), which is a cleaner mapped to the M2, outputs a message for proposing a dance mode, a smart TV mapped to the M2 displays a message indicating that a preferred channel or preferred content is available, and a refrigerator mapped to the M2 outputs a message for inducing a user to open the refrigerator.

As shown in FIG. 22, a user executes a mobile messenger of a mobile terminal according to one embodiment of the present invention and simply inputs such a command as "I am shopping. What to have for dinner tonight?" by designating M2 as a counterpart.

In this case, as shown in FIG. 22, a message for recommending a specific function of a specific device is outputted in response to the inputted question "What to have for dinner tonight?" For example, an oven mapped to the M2 outputs a message for proposing a specific dish and a refrigerator mapped to the M2 outputs a message indicating that there is no material for the recommended dish to induce a user to buy specific material while shopping.

FIGS. 23 to 26 are diagrams for a process of recommending recording specific content, a process of recording and a process of displaying recorded content using a mobile messenger.

Figure 23:
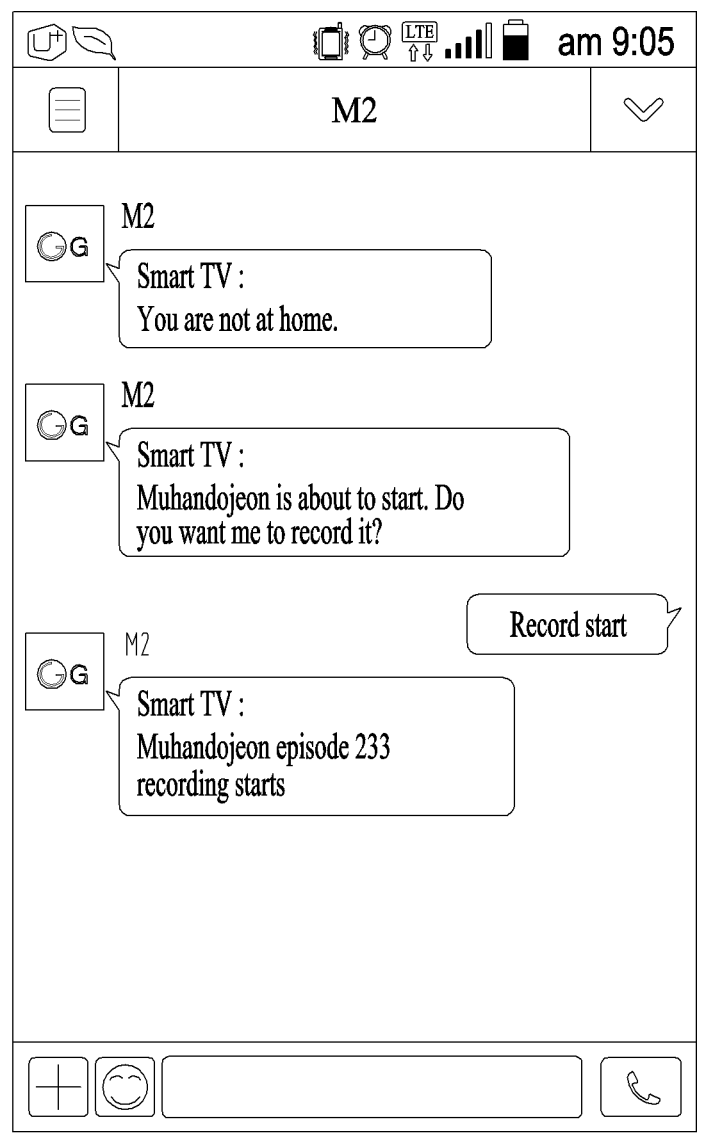
FIGS. 23 to 26 are diagrams for a process of recommending recording specific content, a process of recording and a process of displaying recorded content using a mobile messenger.

As shown in FIG. 23, when location information of a mobile terminal according to one embodiment of the present invention is traced, if it is determined as a user of the mobile terminal is not at home, a message for indicating specific content (broadcast program) starts soon is automatically displayed on a mobile messenger. Meanwhile, the specific content can be automatically extracted based on history of using a TV by the user. When the user manually configures the specific content as preferred content, the present invention can be applied as well.

Figure 24:
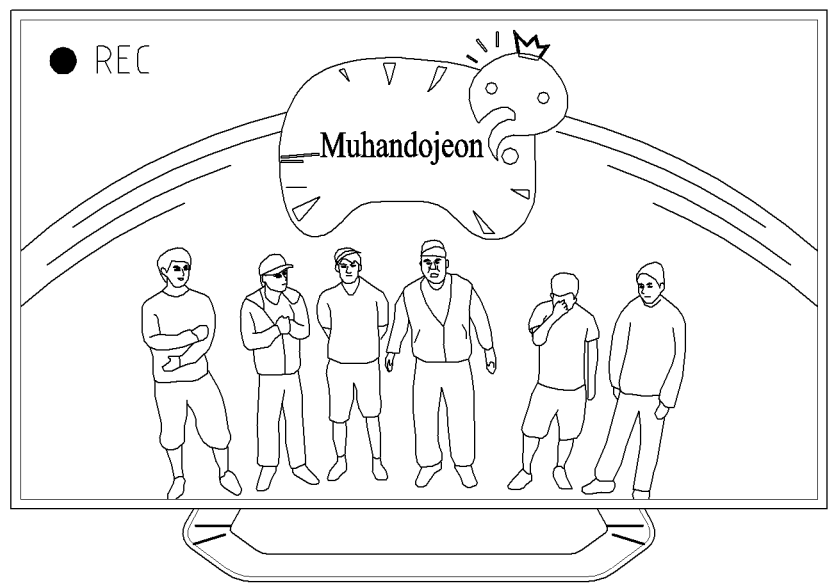

Moreover, as shown in FIG. 23, if a message for accepting recording of recommended content is inputted, as shown in FIG. 24, the recommended content is automatically recorded. Of course, power of a TV is switched to on state from standby state to record the recommended content and the power is switched back to the standby state after the recording is terminated. This also belongs to the scope of the present invention.

Figure 25:
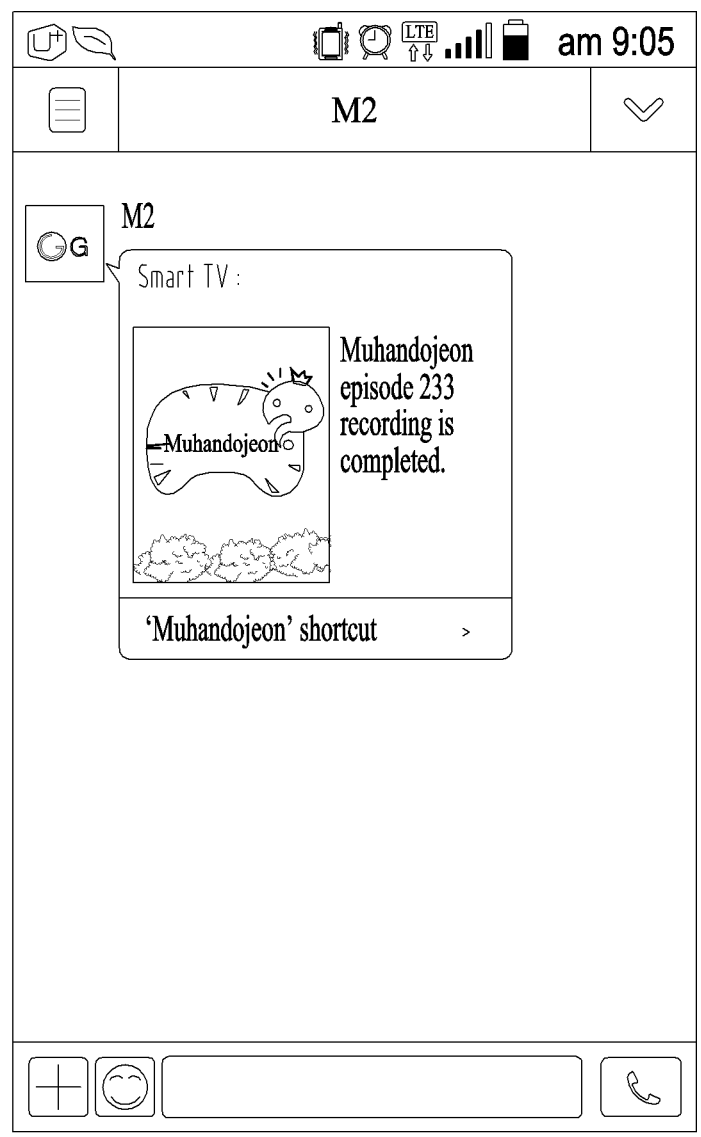
Figure 26:
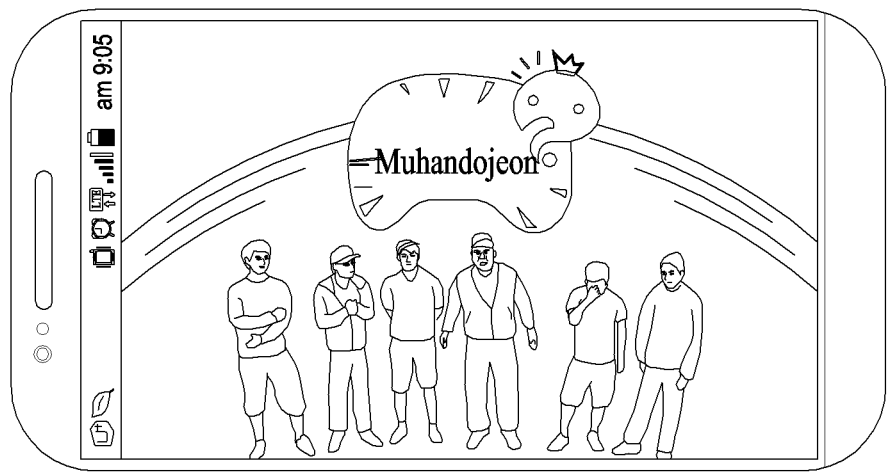

After the recording is all completed, as shown in FIG. 25, a message for indicating the recording of the specific content is completed is outputted together with a message for indicating the specific content is capable of being watched right away. In this case, if the user selects immediate watching, the recorded content is displayed on the mobile terminal. Of course, the recorded content can be transmitted to the mobile terminal via the TV or the recorded content can be automatically uploaded to a cloud server and the mobile terminal accesses the cloud server to watch the recorded content.

FIGS. 27 to 30 are diagrams for a process of sharing a specific picture file using a mobile messenger.

Figure 27:
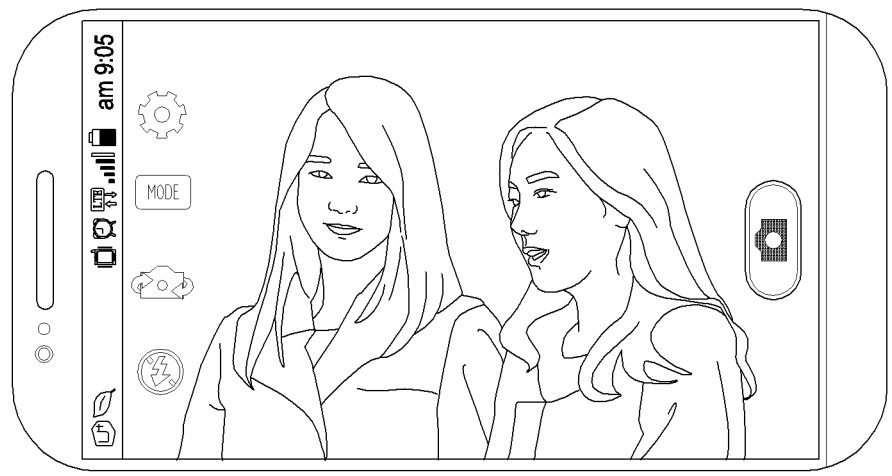
FIGS. 27 to 30 are diagrams for a process of sharing a specific picture file using a mobile messenger.
Figure 28:
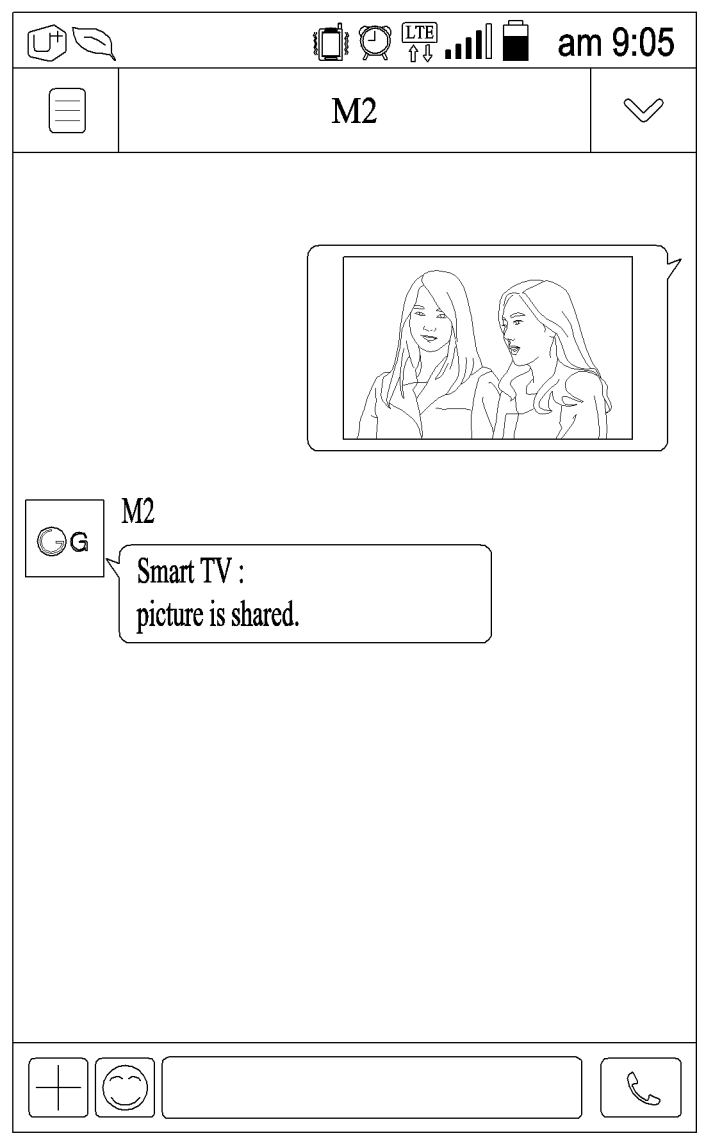
Figure 29:
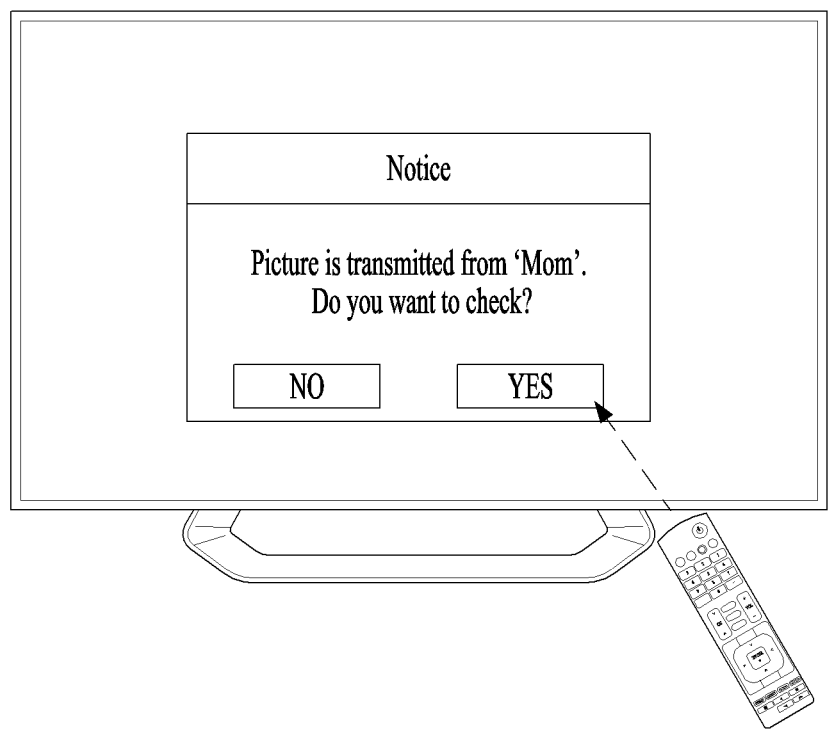
Figure 30:
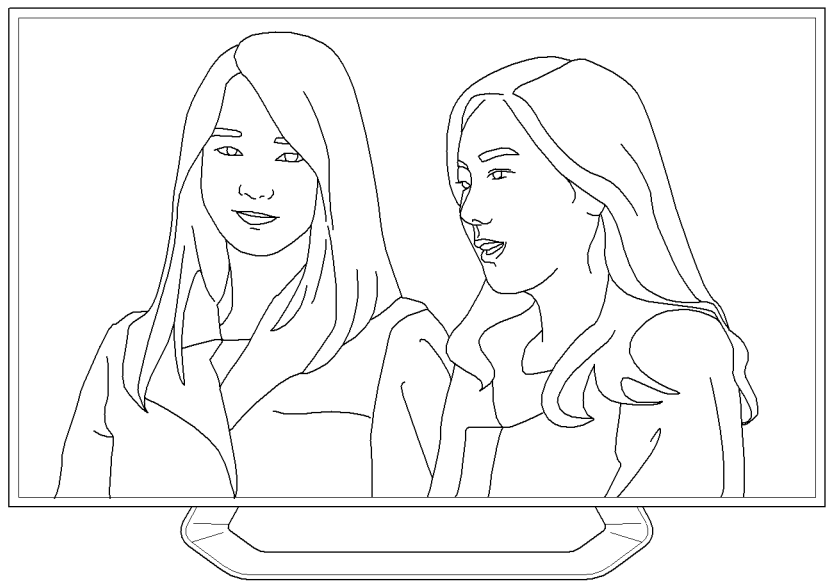

As shown in FIG. 27, when a picture is captured using a mobile terminal according to one embodiment of the present invention, as shown in FIG. 28, a mobile messenger is automatically or manually executed and a message for indicating the captured picture is shared with a TV is displayed on the mobile messenger. Moreover, as shown in FIG. 29, a message for inquiring whether to output the picture shared with the mobile terminal is outputted on the TV. If the message is selected, as shown in FIG. 30, the picture captured by the mobile terminal is immediately displayed on the TV. Hence, a user is able to omit a complex process of sharing a picture with a cloud server and the like.

FIGS. 31 to 34 are diagrams for a process of monitoring an external device using a mobile messenger.

Figure 31:
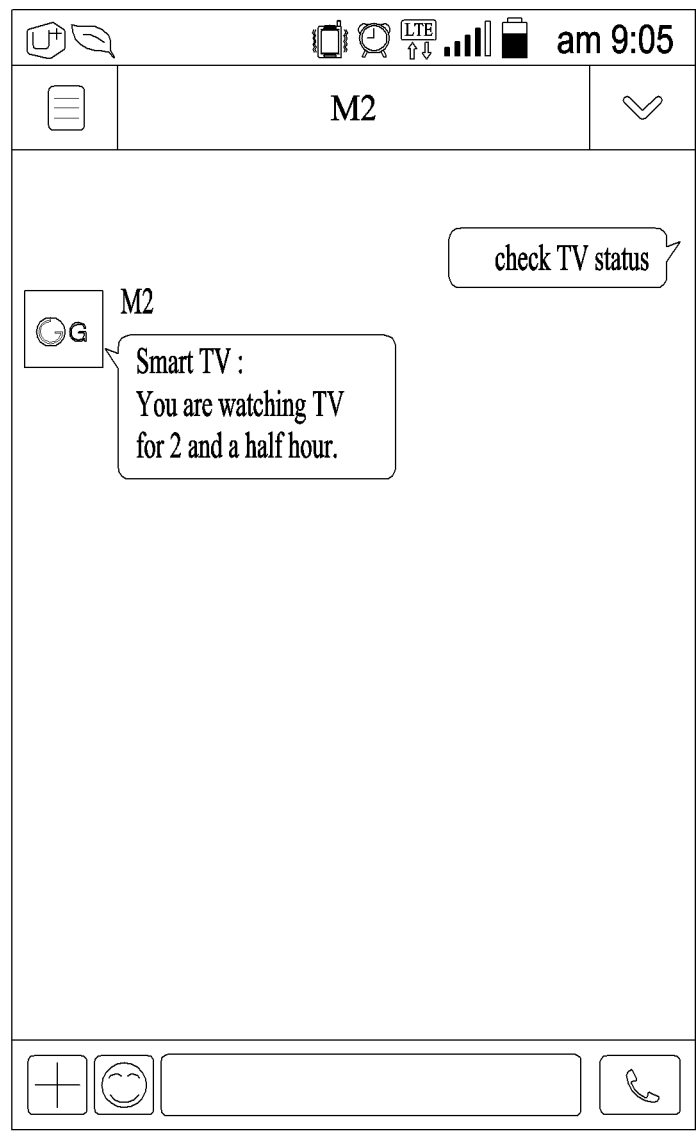
FIGS. 31 to 34 are diagrams for a process of monitoring an external device using a mobile messenger.

As shown in FIG. 31, if a user inputs a text for checking a status of a specific device (e.g., TV), a result of monitoring a current status of a TV is outputted. In this case, a user of a mobile terminal according to one embodiment of the present invention adds a family member (e.g., son) expected to stay at home as a conversation counterpart or automatically adds a user of a different mobile terminal staying at home as a conversation counterpart based on location information.

Figure 32:
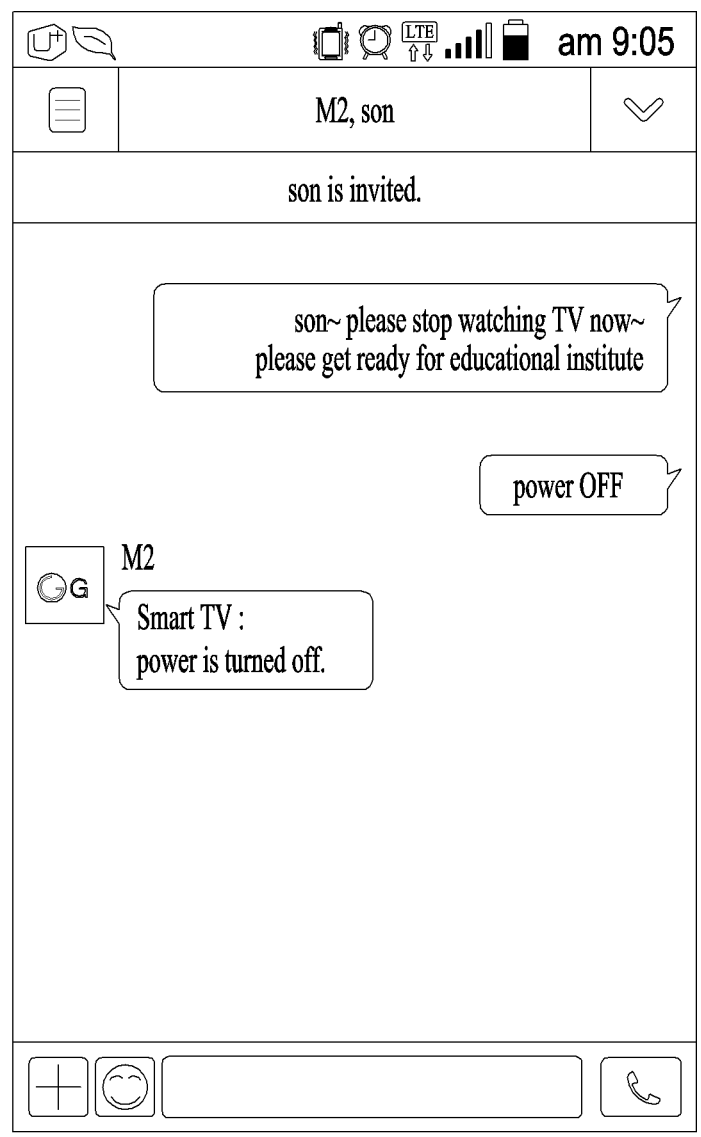
Figure 33:
Figure 34:
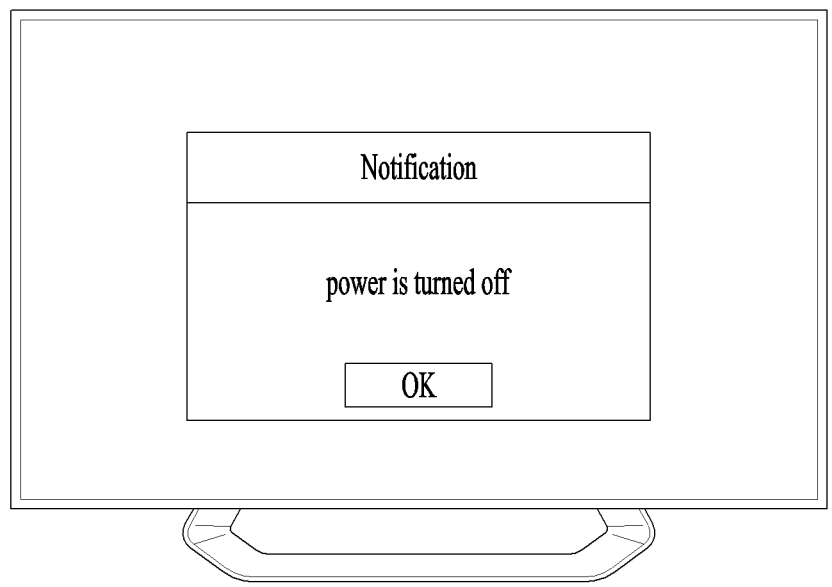

In this case, if the user of the mobile terminal according to one embodiment of the present invention inputs such a text as "power OFF", as shown in FIG. 32, power status of the TV is automatically changed to off status. Or, the status of the TV may not be immediately changed to the OFF status in consideration of a family member currently watching the TV. As shown in FIG. 33, a message inputted before "power OFF" is outputted via a TV screen. In this case, power of the TV is not turned off by conversation content of the mobile messenger only. As shown in FIG. 34, power of the TV is changed into the off status only when a power off signal is provided via a remote controller of the TV.

FIGS. 35 to 38 are diagrams for a process of monitoring a cloud server using a mobile messenger.

Figure 35:
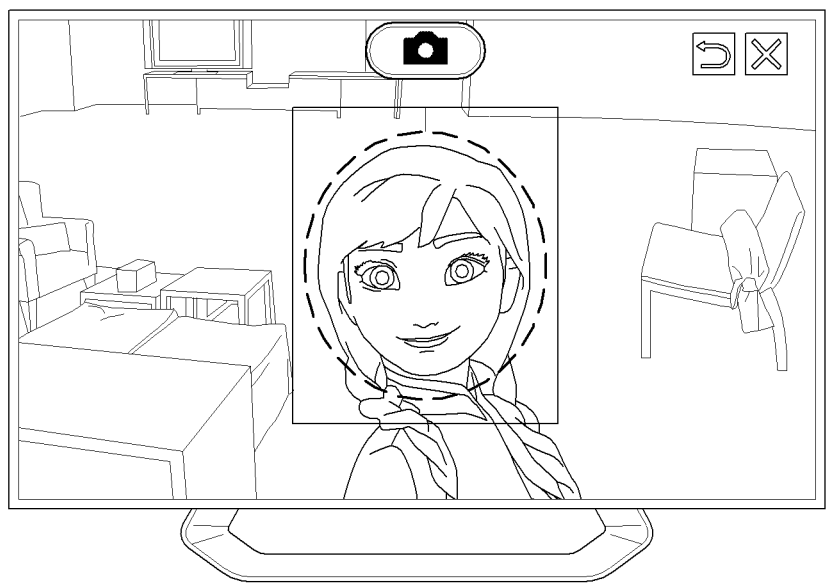
FIGS. 35 to 38 are diagrams for a process of monitoring a cloud server using a mobile messenger.
Figure 36:
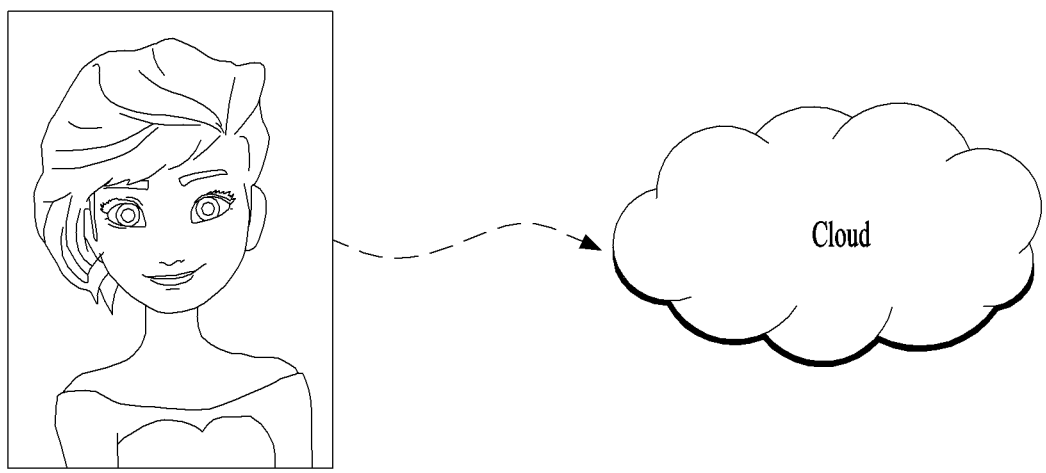
Figure 37:
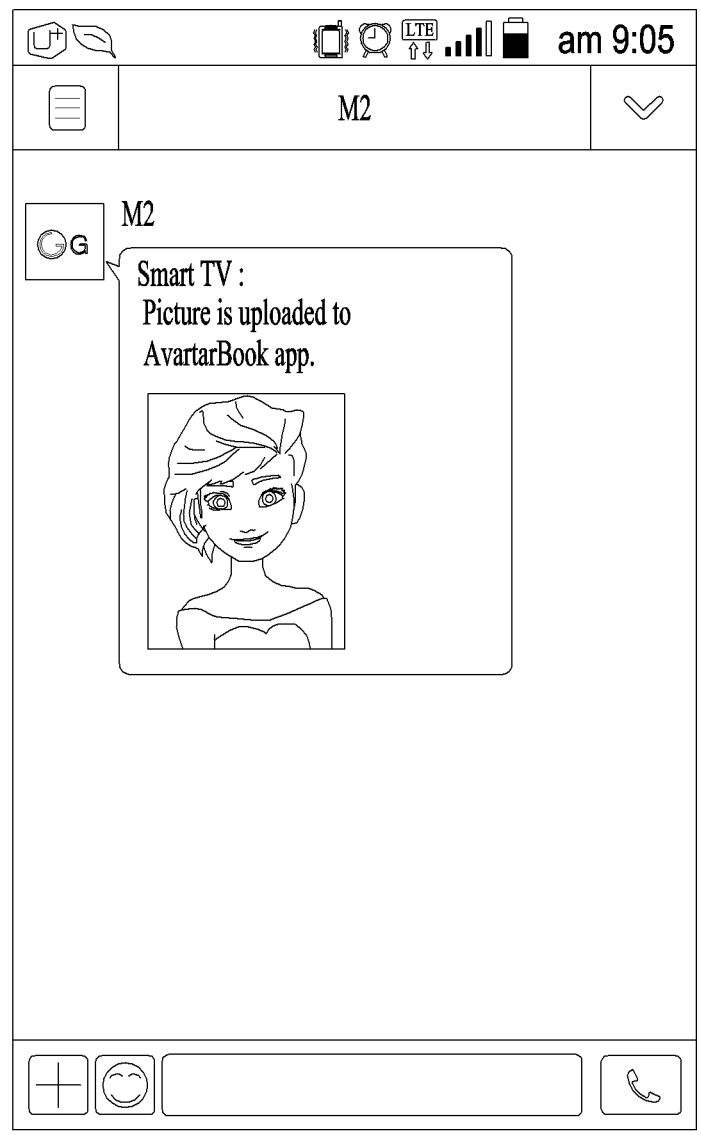
Figure 38:
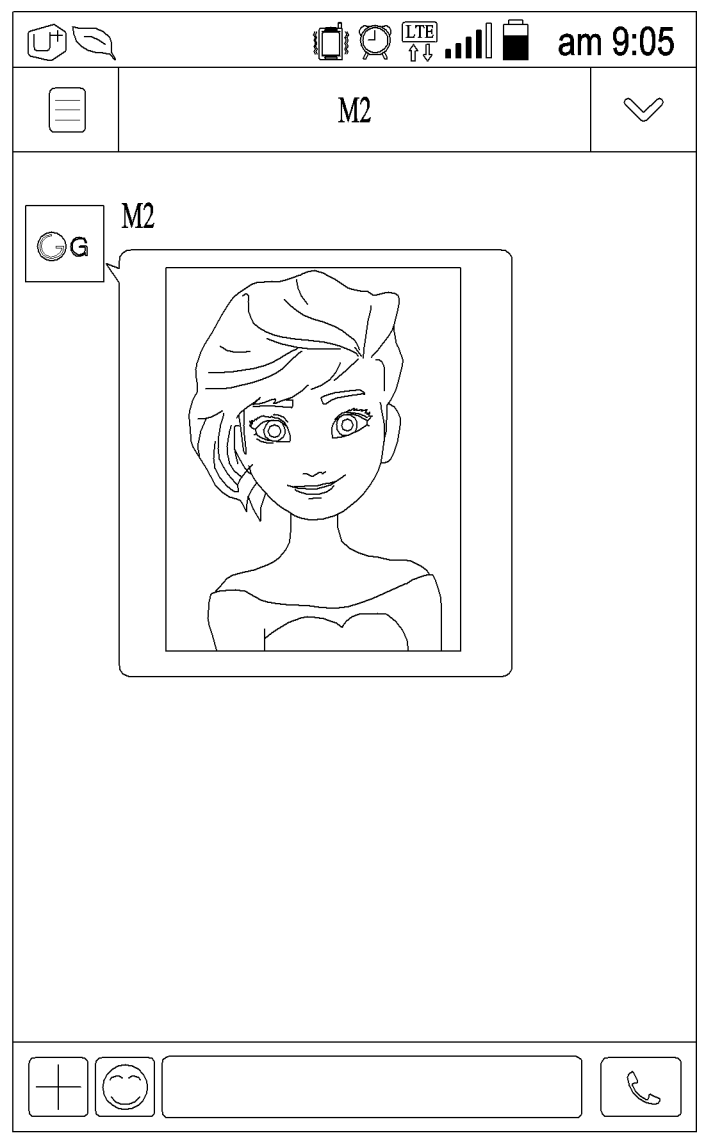

As shown in FIG. 35, if picture capturing using a TV camera is completed, as shown in FIG. 36, a picture captured by the TV camera is automatically uploaded to a cloud server. In this case, as shown in FIG. 37, a mobile messenger according to one embodiment of the present invention is automatically executed and information indicating that a random picture is automatically uploaded to the cloud server is displayed on a conversation window. Hence, as shown in FIG. 38, a user can check the picture uploaded to the cloud server through a TV using the mobile terminal in real time, thereby reducing unnecessary access time.

Figure 39:
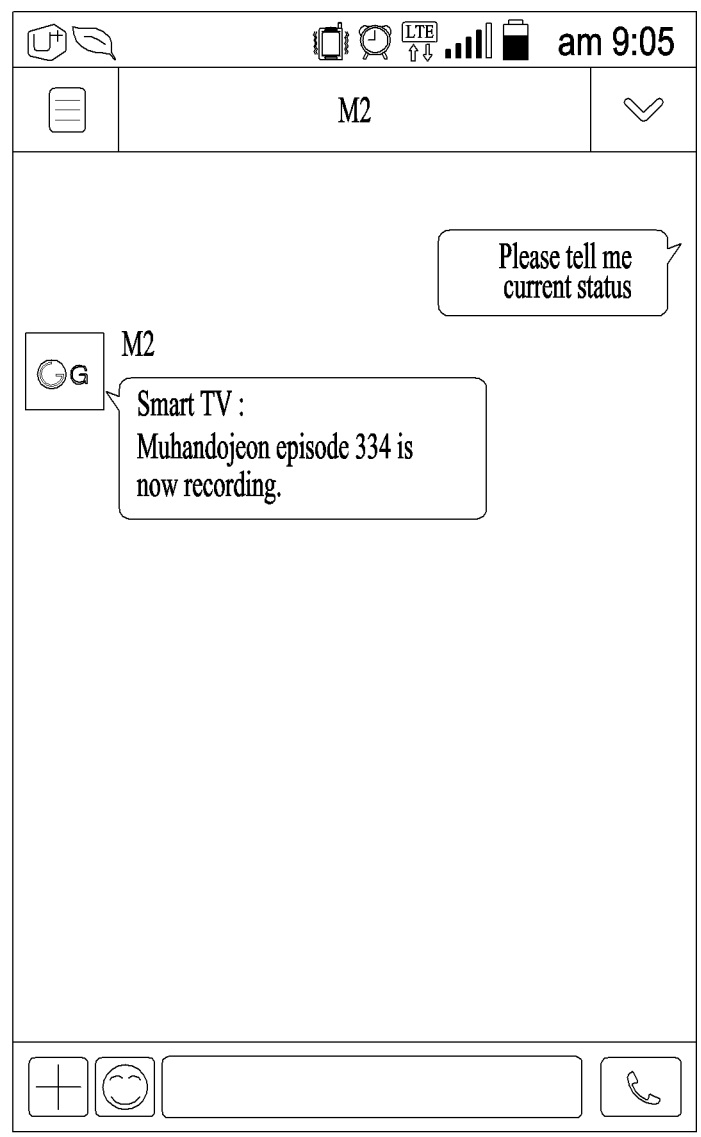
FIGS. 39 to 41 are diagrams for a process of controlling power status of an external device and the like using a mobile messenger.
Figure 40:
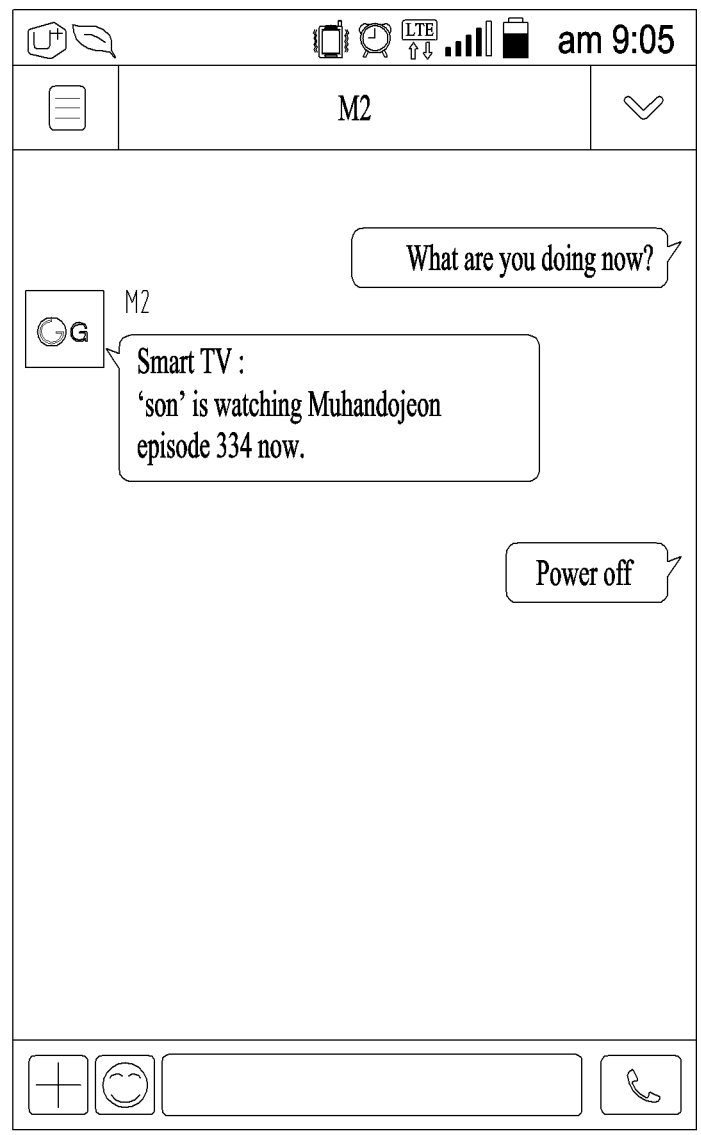
Figure 41:
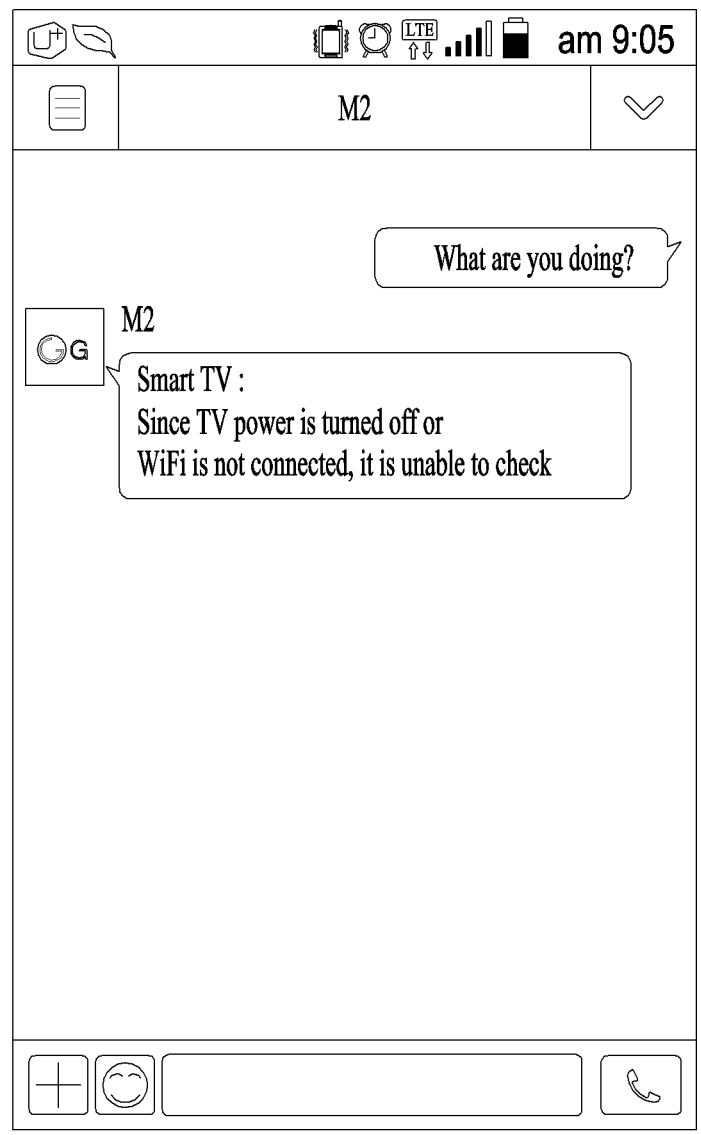

FIGS. 39 to 41 are diagrams for a process of controlling power status of an external device and the like using a mobile messenger. A mobile messenger described in the present specification corresponds to an application capable of making a conversation with a different smartphone user in real time in a smartphone. More specifically, for example, the mobile messenger may correspond to HomeChat, Line, KakaoTalk, WhatApp, blackberry messenger, MSN or the like, by which the present invention may be non-limited.

As shown in FIG. 39, when a mobile terminal according to one embodiment of the present invention executes a mobile messenger and then inputs such a text as "notify current status" to the mobile messenger, status of all devices connected or registered at the M2 are listed. Moreover, as shown in FIG. 40, if such a text as "power OFF" is inputted, a corresponding command is transmitted to a TV. And, as shown in FIG. 41, if it is unable to transmit the command to the TV, a message for indicating a state that TV power is turned off or WiFi is not connected is outputted. Hence, a user does not recognize the state as an error. The user immediately checks the power status of the TV or the network status and may be then able to readjust the status.

Figure 42:
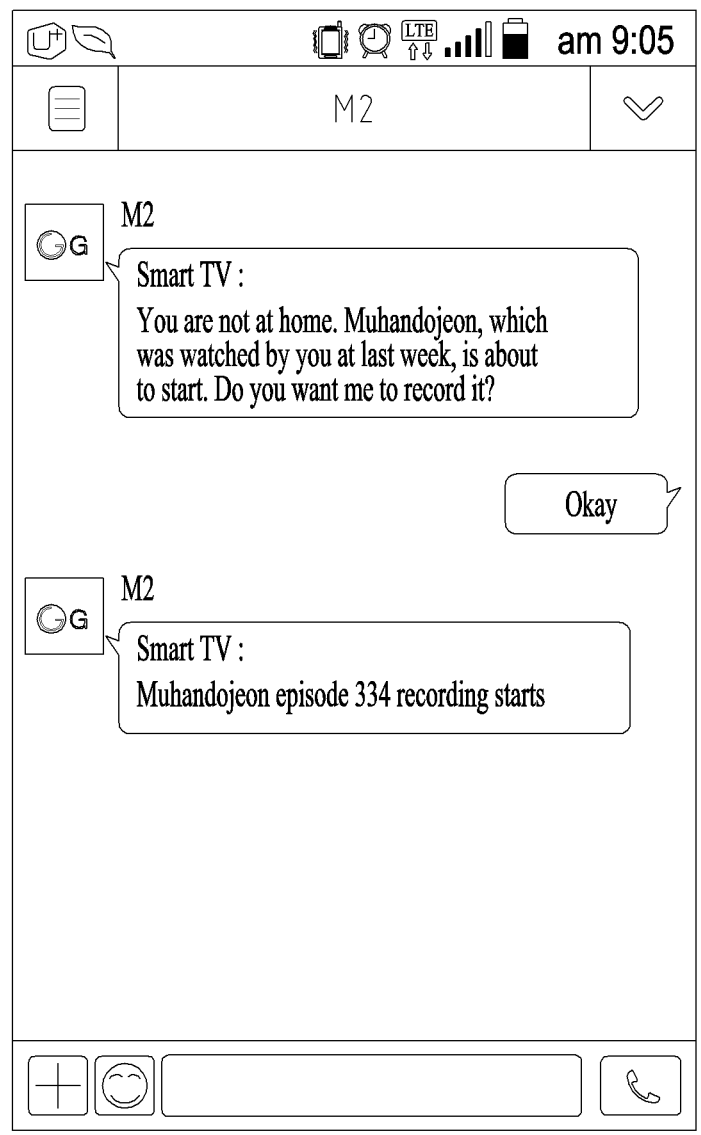
FIGS. 42 and 43 are diagrams for a process of selectively outputting specific record contents from among a plurality of devices using a mobile messenger.
Figure 43:
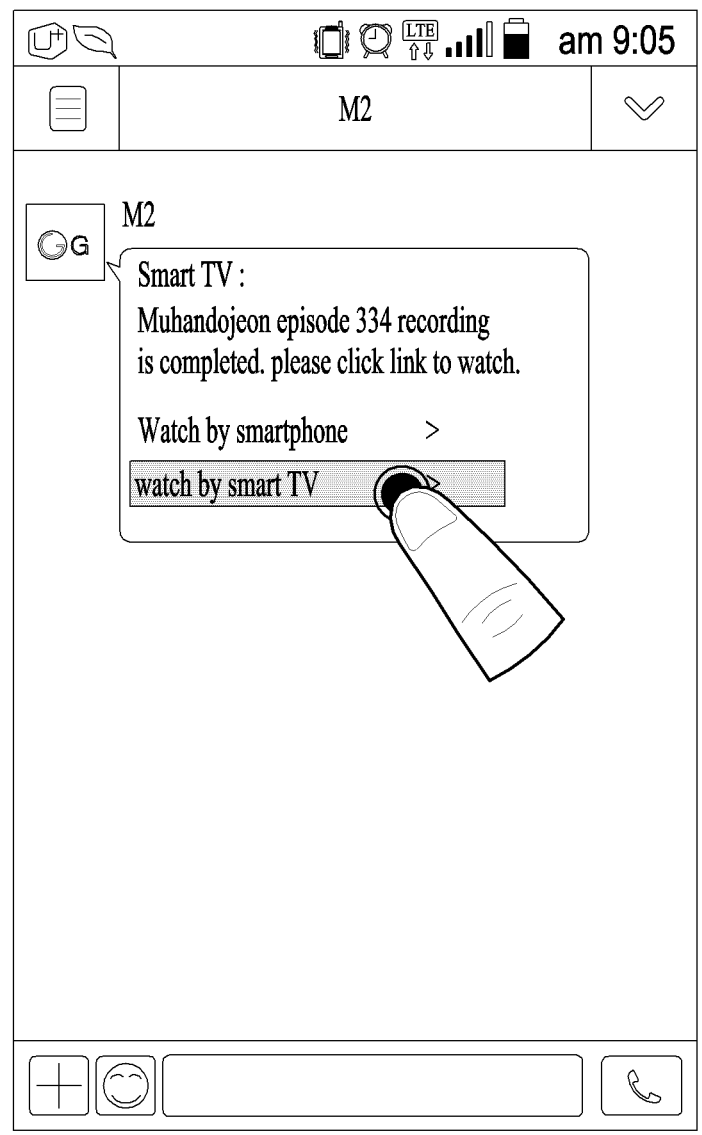

FIGS. 42 and 43 are diagrams for a process of selectively outputting specific record contents from among a plurality of devices using a mobile messenger.

As shown in FIG. 42, if it is determined as a mobile terminal according to one embodiment of the present invention is not at home, a notification message for specific content, which has been watched at last week, is displayed. After recording of the specific content is completed, as shown in FIG. 43, an option capable of selecting a device for outputting the recorded content is displayed.

Figure 44:
Figure 45:
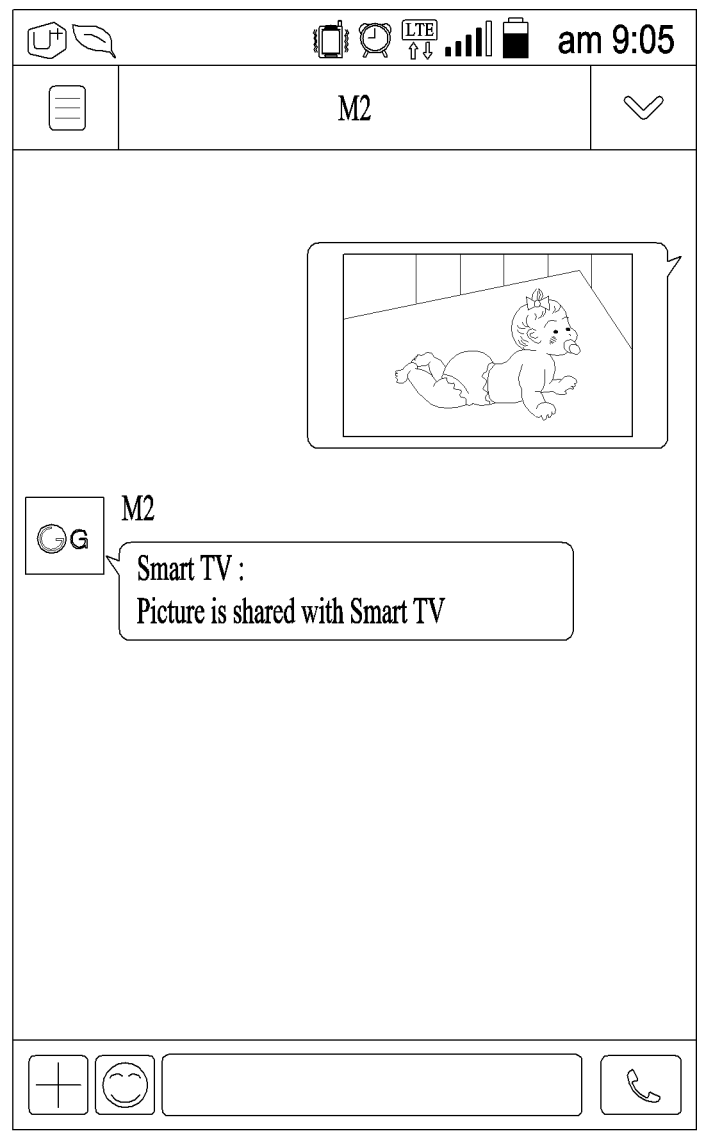

FIGS. 44 to 46 are diagrams for a process of transmitting a specific picture file using a mobile messenger. In FIGS. 27 to 30, it is assumed as a mobile messenger is automatically executed when a mobile terminal takes a picture. On the contrary, in FIGS. 44 to 46, it is assumed as a user manually executes the mobile messenger after a picture is captured. This is an embodiment to which hostility of a user for automatic execution is reflected.

As shown in FIG. 44, after a mobile terminal according to the present invention captures a picture, as shown in FIG. 45, a mobile messenger is executed. If the captured picture is transmitted to M2 (LG Electronics) designated as a counterpart on the mobile messenger, a device capable of sharing the picture responds to the picture. Although a TV is explained as an example in FIG. 45, a tablet PC, a desktop, a refrigerator equipped with a display can be configured to respond to the picture. Hence, a user can select a specific device used for sharing the picture. For example, as shown in FIG. 46, when the picture is shared by a TV, the picture captured by the mobile terminal is outputted via a TV screen.

Figure 47:
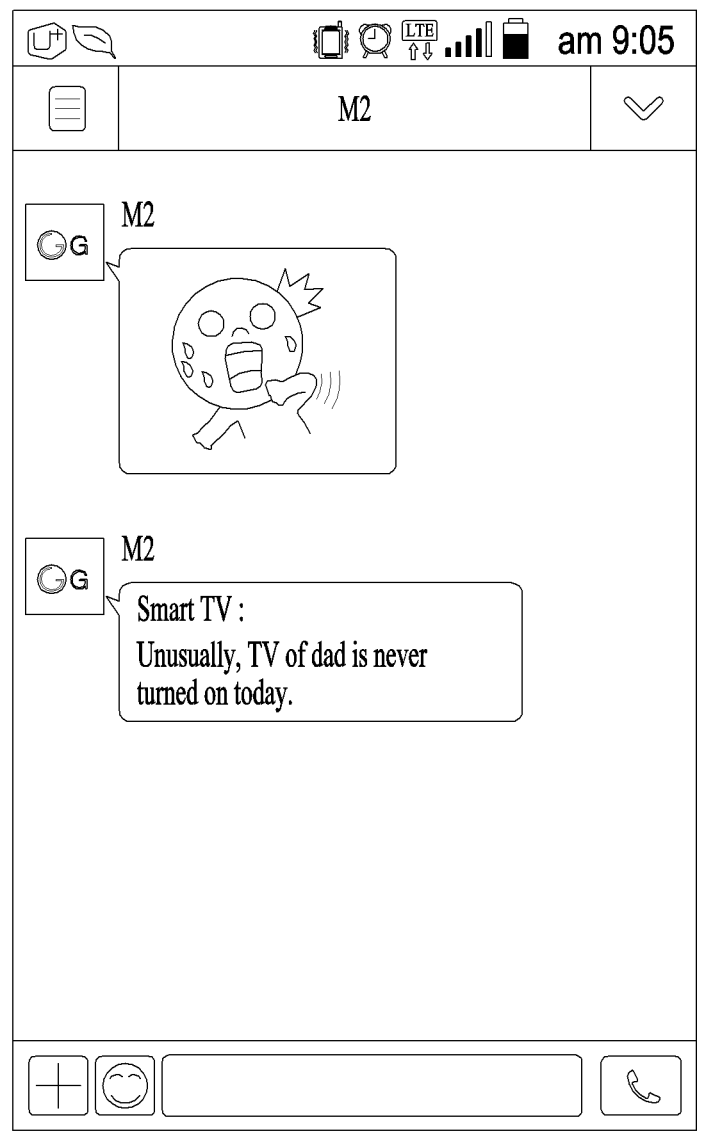
FIGS. 47 to 49 are diagrams for a process of analyzing a user pattern using a mobile messenger.
Figure 48:
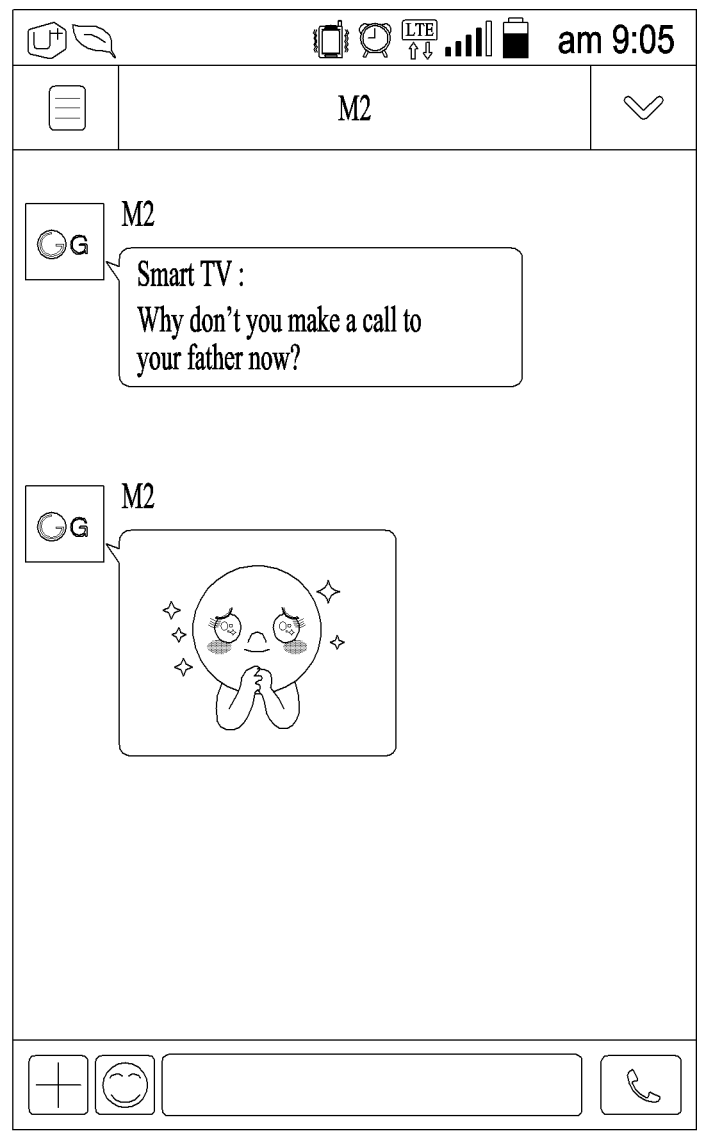
Figure 49:
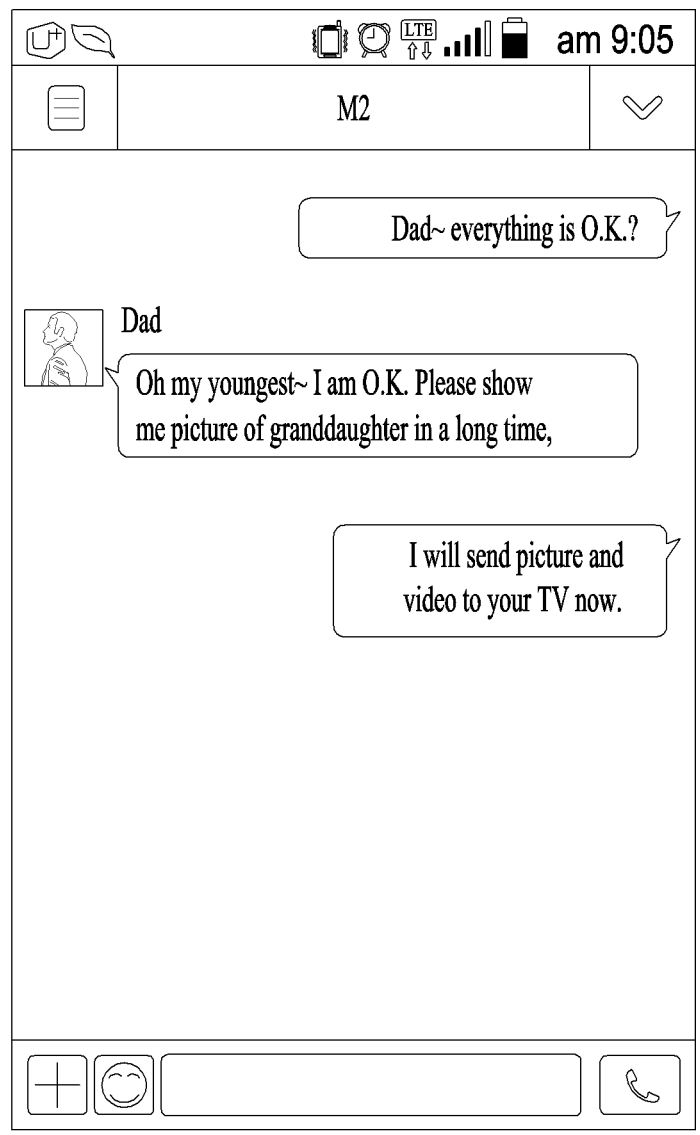

FIGS. 47 to 49 are diagrams for a process of analyzing a user pattern using a mobile messenger.

As shown in FIG. 47, a specific counterpart (M2, LG Electronics) of a mobile messenger according to one embodiment of the present invention consistently monitors status information on pre-registered devices. Hence, as shown in FIG. 47, although a user of a mobile terminal does not input any text, it is able to output status information on an unused specific device.

Hence, as shown in FIG. 48, since a specific device (e.g., a TV of father) is never turned on, an option for recommending a hello message is outputted to an owner of the specific device. For example, the hello message is displayed in a form shown in FIG. 49.

FIG. 50 is a diagram for a database to which a specific command (trigger) and an action of an external device corresponding to the specific command (trigger) are mapped according to one embodiment of the present invention.

In order to implement the mobile messenger mentioned earlier in FIGS. 5 to 49, it is necessary to map a relationship between a specific command (trigger) and a specific action of a specific device in advance. For example, an action of tuning off power of all devices is designed to be executed in response to such a command as "going out".

Moreover, a different characteristic of the present invention is to permit some parts of a trigger-action-based principle to a user. In particular, a specific trigger and a specific action are designed to be freely added, changed and deleted by a user.

For example, as shown in FIG. 50, when a user continuously changes TV channels, it is able to design a broadcast program or an application preferred by the user to be automatically executed or recommended with reference to history previously used by the user.

Or, as shown in FIG. 50, when a random mobile terminal receives a call, it is able to design volume of a TV to be muted. When an operation of an oven is completed, it is able to design a relevant pop-up message to be automatically displayed on a TV. In particular, the triggers and the actions shown in FIG. 50 are designed to be designated or modified by a user.

In the process of controlling a different device using the mobile messenger, commands in conflict with each other can be inputted to the mobile messenger. For example, when mother executes a sleep mode at 22:00 using a mobile messenger and father executes a returning home mode at 23:00 using the same mobile messenger, if the sleep mode is ignored, it may have a problem of not matching with the need of mother. In particular, in this case, there is a problem of giving priority to a command. A solution and embodiments for the problem are explained in detail with reference to FIGS. 51 to 55 in the following.

Figure 51:
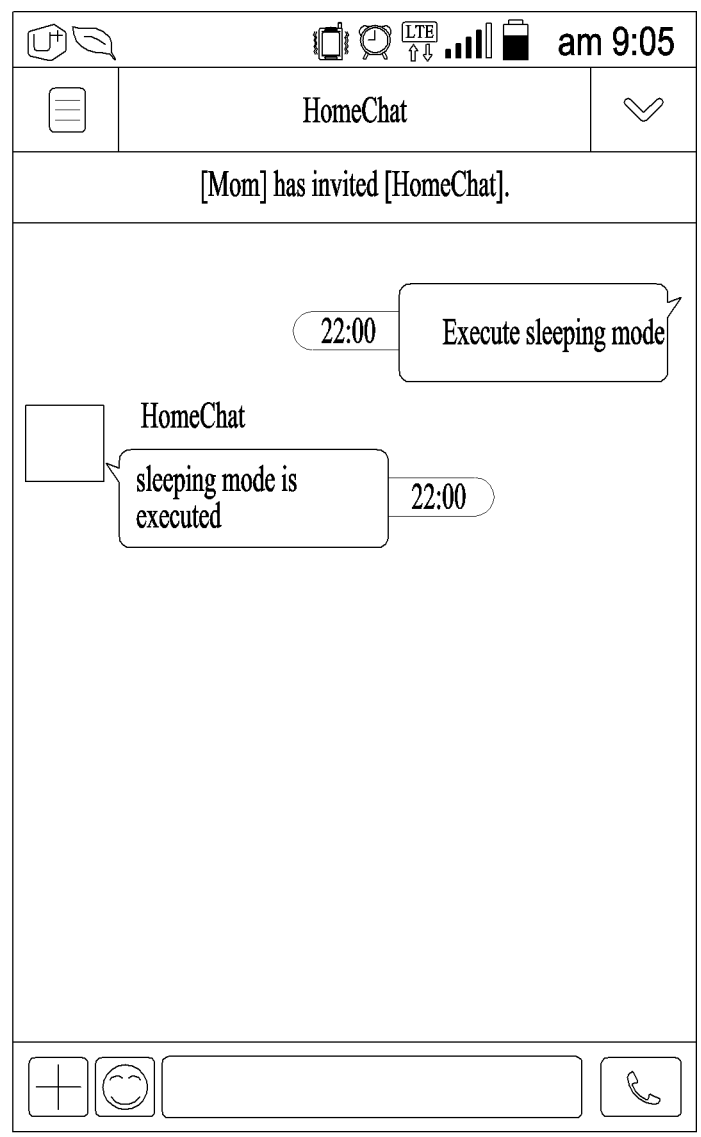
FIGS. 51 and 52 are diagrams for one embodiment of solving a collision of two or more commands when a mobile messenger is used.
Figure 52:
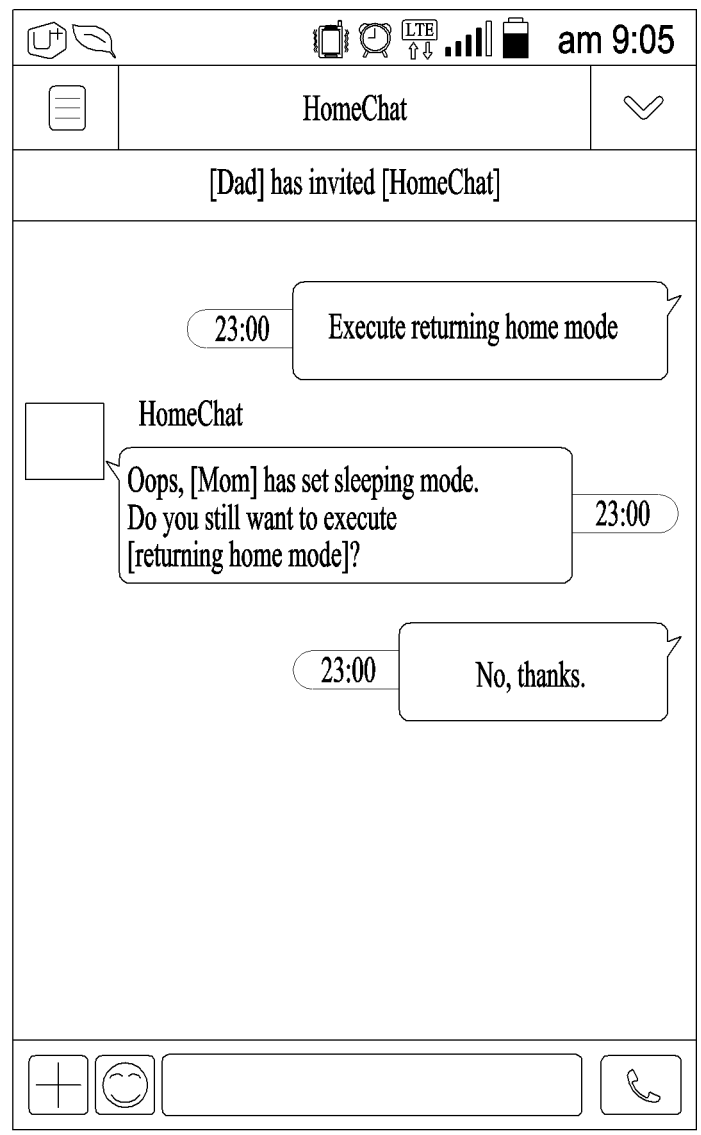

FIGS. 51 and 52 are diagrams for one embodiment of solving a collision of two or more commands when a mobile messenger is used.

HomeChat shown in FIG. 51 corresponds to the previously explained M2 counterpart. In particular, the HomeChat corresponds to a virtual counterpart in a mobile messenger for controlling a plurality of devices at home connected with other by a network, the Internet, a network for IoT, etc. Meanwhile, since the virtual counterpart, i.e., the HomeChat is able to register all family members as a counterpart, a collision problem may occur.

For example, as shown in FIG. 51, if a random mobile terminal (owned by mother) executes a mobile messenger and a text for executing a sleep mode is inputted at 22:00 by designating HomeChat as a counterpart, the sleep mode is executed immediately. The sleep mode corresponds to a status that powers of all devices registered at the HomeChat are turned off.

As shown in FIG. 52 under the assumption of FIG. 51, if a different mobile terminal (owned by father) executes a mobile messenger and a text for executing a returning home mode is inputted at 23:00 by designating the same HomeChat as a counterpart, since the returning home mode and the sleep mode are collided with each other, a message for notifying the existence of the sleep mode previously set by mother is outputted instead of immediately executing the returning home mode (status that powers of all devices registered at the HomeChat are turned on).

Meanwhile, according to a different embodiment of the present invention, whether or not texts inputted by a plurality of users are collided with each other can be designed to be filtered on the basis of concept of "time" and "location" as an additional determination reference.

Although the "sleep mode" and the "returning home mode" shown in FIG. 51 and FIG. 52 can be interpreted as commands collided with each other, if the commands are respectively received with a very long time interval, it is not necessary to interpret the commands as the commands collided with each other. For example, if the "sleep mode" is inputted via A mobile device at 11:00 P.M. and the "returning home mode" is inputted via B mobile device at 5:00 A.M., it is not necessary to output the message shown in FIG. 52 by interpreting the inputted modes as commands collided with each other. Hence, if commands collided with each other are received with a time interval greater than predetermined time (e.g., 6 hours), the message shown in FIG. 52 is designed not to be outputted. This also belongs to the scope of the present invention.

Moreover, although the "sleep mode" and the "returning home mode" shown in FIG. 51 and FIG. 52 can be interpreted as commands collided with each other, if the commands are respectively received from positions different from each other, it is not necessary to interpret the commands as the commands collided with each other. For example, if the "sleep mode" is inputted via A mobile device at 11:00 P.M. while the A mobile device is detected at a point far from home and the "returning home mode" is inputted via B mobile device at 11:10 P.M., it is not necessary to output the message shown in FIG. 52 by interpreting the inputted modes as commands collided with each other. This is because a user carrying the A mobile device assumes a situation that no one stays at home. Hence, if a mobile terminal of a user, which has set a going out mode, is not detected near a home of the user (e.g., if the mobile terminal is separated from the home of the user more than 5 Km), although a next inputted command is collided, the message shown in FIG. 52 is designed not to be outputted irrespective of a time interval. This belongs to a different characteristic of the present invention.

Figure 53:
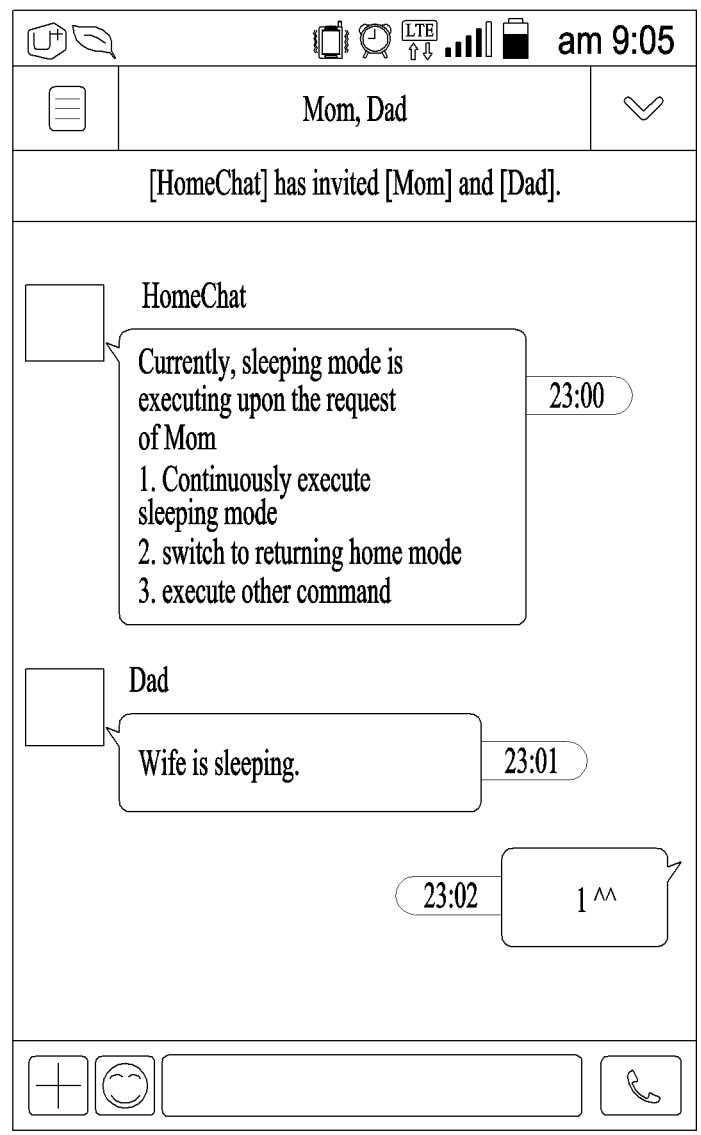
FIG. 53 is a diagram for a different embodiment of solving a collision of two or more commands when a mobile messenger is used.

FIG. 53 is a diagram for a different embodiment of solving a collision of two or more commands when a mobile messenger is used.

Unlike FIG. 52, in FIG. 53, if there exist two or more devices inputting commands collided with each other, a mobile messenger inviting all users of each of the devices is executed. For example, as shown in FIG. 53, "a first option for inquiring whether to continuously execute a currently configured sleep mode", "a second option for inquiring whether to switch to a returning home mode and execute the returning home mode" and "a third option for inducing a user to input a different third command again" are outputted and an option selected from among the options is designed to be executed only. Moreover, if commands collided with each other are inputted via each of 3 or more mobile terminals, a final command is inputted again from each of the mobile terminals, the final commands are gathered, and a most frequently selected option is designed to be executed. This also belongs to the scope of the present invention.

Figure 54:
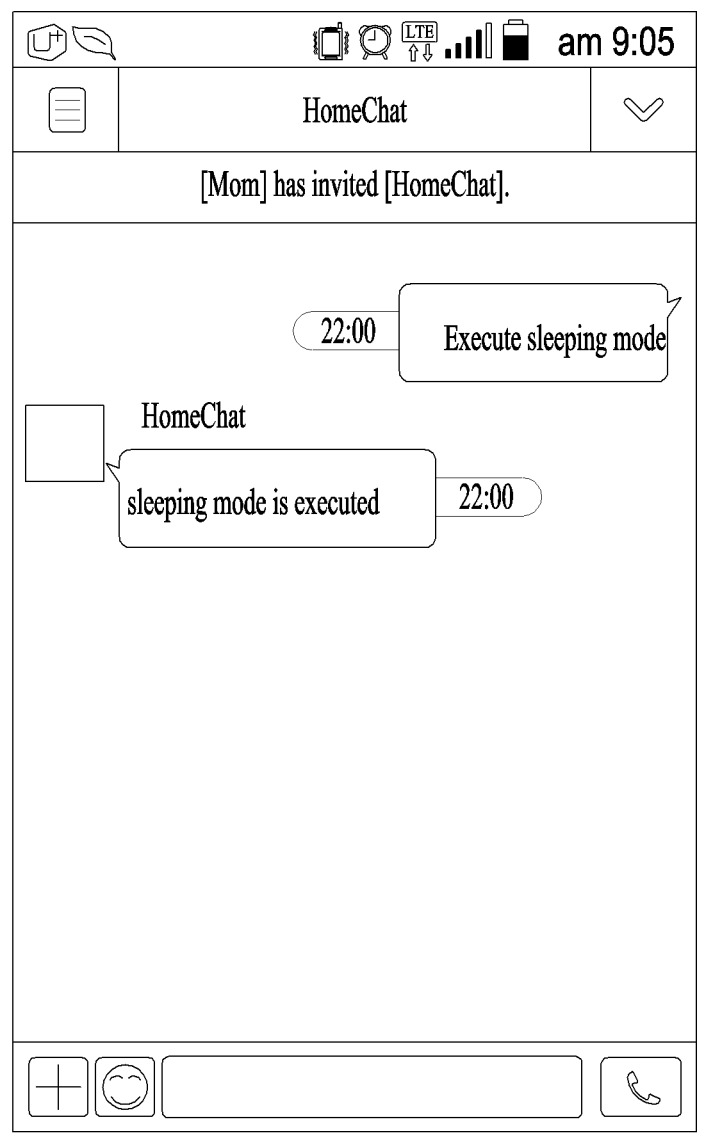
FIGS. 54 and 55 are diagrams for a further different embodiment of solving a collision of two or more commands when a mobile messenger is used.
Figure 55:
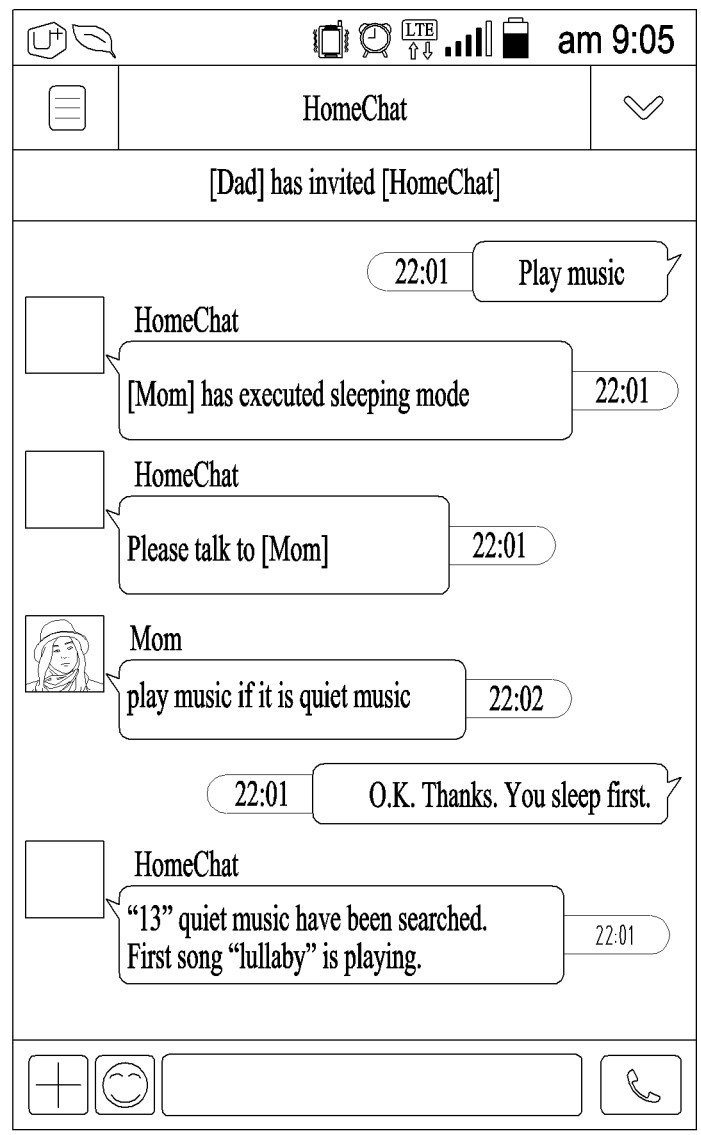

FIGS. 54 and 55 are diagrams for a further different embodiment of solving a collision of two or more commands when a mobile messenger is used.

As shown in FIG. 54, when a sleep mode is executed by mother corresponding to a user of a specific mobile terminal, powers of all devices registered at HomeChat are changed to OFF status.

In this case, as shown in FIG. 55, if such a command as "play music" is inputted via father corresponding to a user of a different mobile terminal, a mobile messenger for adding mother who has configured the sleep mode as a conversation counterpart is executed. As shown in FIG. 55, if mother inputs such a text as "play music if it is quiet music" on the mobile messenger and father accepts it, HomeChat is designed to analyze music and play one of quiet music. A category (loud music, quiet music, etc.) of each music file can be determined and stored in advance in an audio player registered at the HomeChat in advance, a user can manually configure a category, or an audio player automatically analyzes music sources and classifies the music sources according to a category.

Figure 56:
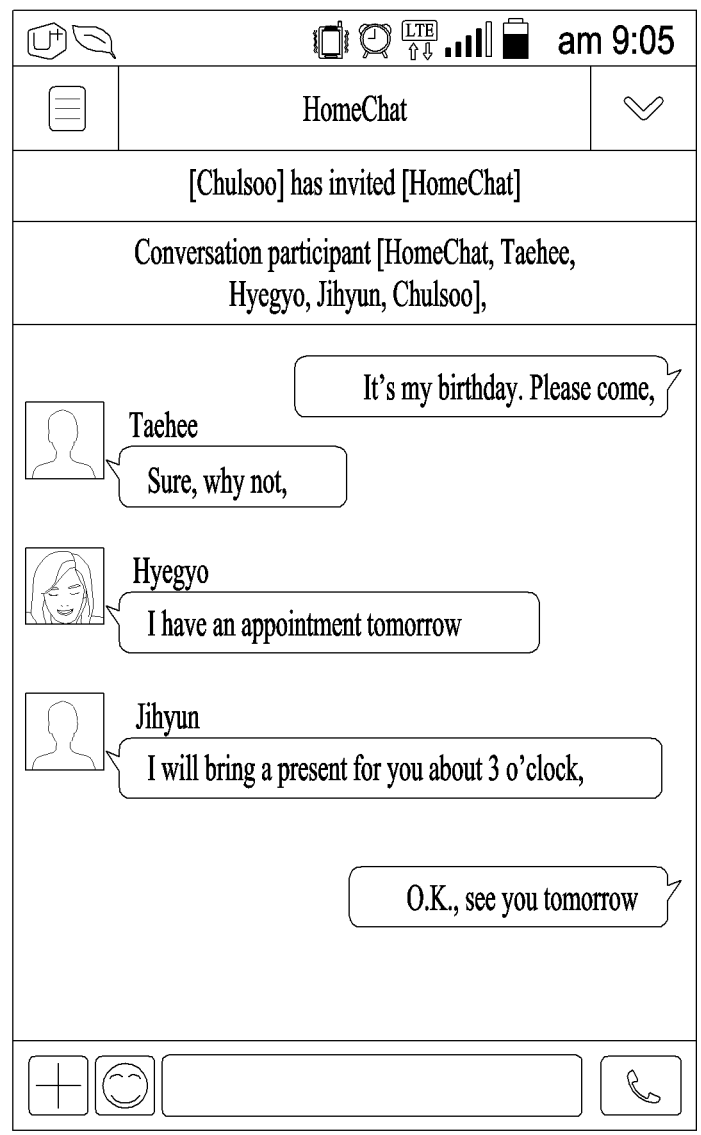
FIGS. 56 and 57 are diagrams for one embodiment of automatically entering a mode preferred by a user using a mobile messenger.

FIG. 56 and later correspond to an embodiment for controlling devices at home registered at HomeChat by automatically detecting a mobile messenger, a different source (e-mail, a text message, etc.) or a status of a different device although a user does not input a specific command on a mobile messenger.

Figure 57:
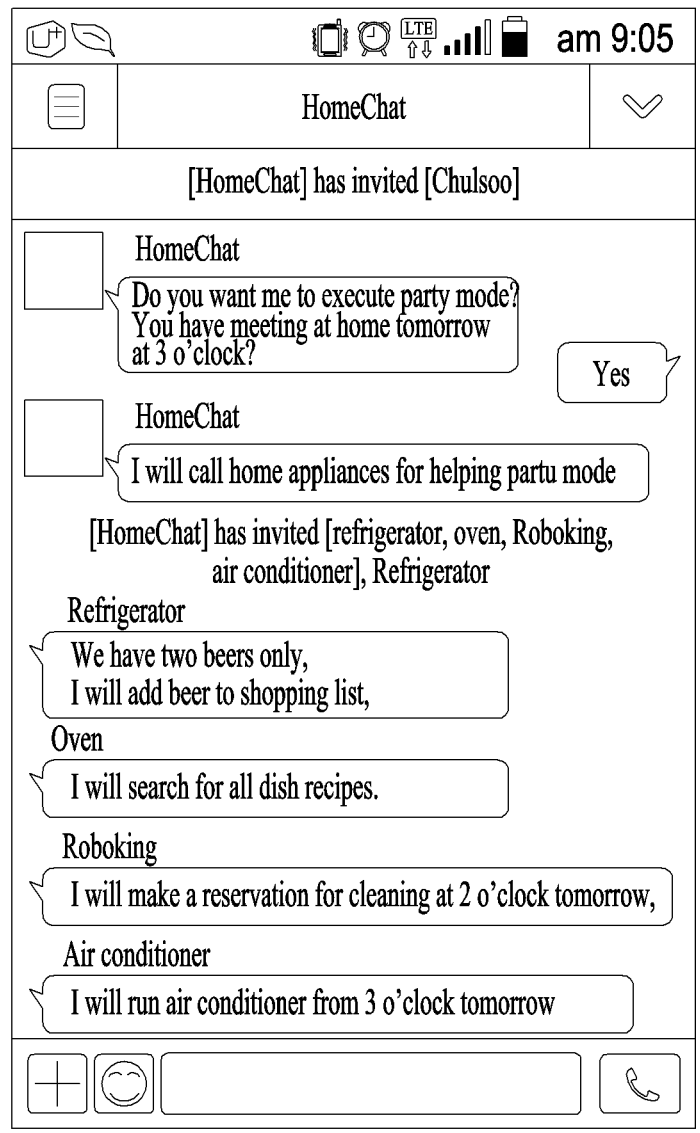

FIGS. 56 and 57 are diagrams for one embodiment of automatically entering a mode preferred by a user using a mobile messenger.

As shown in FIG. 56, a user using a mobile messenger according to one embodiment of the present invention can make a general conversation with general users without inputting a specific text to HomeChat.

In this case, as shown in FIG. 56, the HomeChat analyzes conversation contents and automatically detects main information. For example, the HomeChat analyzes a conversation content analysis result, a keyword (e.g., birthday, housewarming, going out, vacation, etc.), a main participant, time, and the like. Referring to FIG. 56, it is able to recognize a party mode from a "birthday" keyword, expected time corresponds to tomorrow 3 o'clock, and the number of participants corresponds 2 (Taehee and Jihyun).

Moreover, according to a different embodiment of the present invention, old chatting contents are designed to be automatically ignored. For example, conversation contents analysis is implemented for conversation contents of an identical date only. This is because it is not necessary to analyze conversation contents older than a week.

Or, according to a further different embodiment of the present invention, a user can designate an analysis range preferred by the user by such a touch as a long click and the like. Or, the user can transmit a conversation content part preferred by the user to the HomeChat in a manner of capturing the conversation content part only.

And, as shown in FIG. 57, a message for reconfirming an analysis result of the conversation contents shown in FIG. 56 is outputted. Moreover, as shown in FIG. 57, devices mapped to a party mode are called. The devices mapped to the party mode and information on a specific function can be stored in a memory in advance in a database from shown in FIG. 50 or a user can directly configure the devices mapped to the party mode and the information on the specific function.

FIGS. 58 and 59 are diagrams for a different embodiment of automatically entering a mode preferred by a user using a mobile messenger.

FIGS. 56 and 57 correspond to embodiments for automatically entering a specific mode by analyzing conversation contents of a mobile messenger. On the contrary, FIGS. 58 and 59 correspond to embodiments for automatically entering a specific mode by analyzing an SMS text message or e-mail contents corresponding to a different source.

First of all, as shown in FIG. 58, text messages (SMS) received from at least one or more mobile terminals are analyzed and "birthday party is scheduled on a specific date" is detected based on a result of the analysis. And, as shown in FIG. 59, HomeChat outputs a message for guiding how to automatically operate "refrigerator", "oven" and "air conditioner" on the scheduled birthday party on the mobile messenger. Hence, it is not necessary for a user to make a conversation related to the birthday on the mobile messenger.

Figure 60:
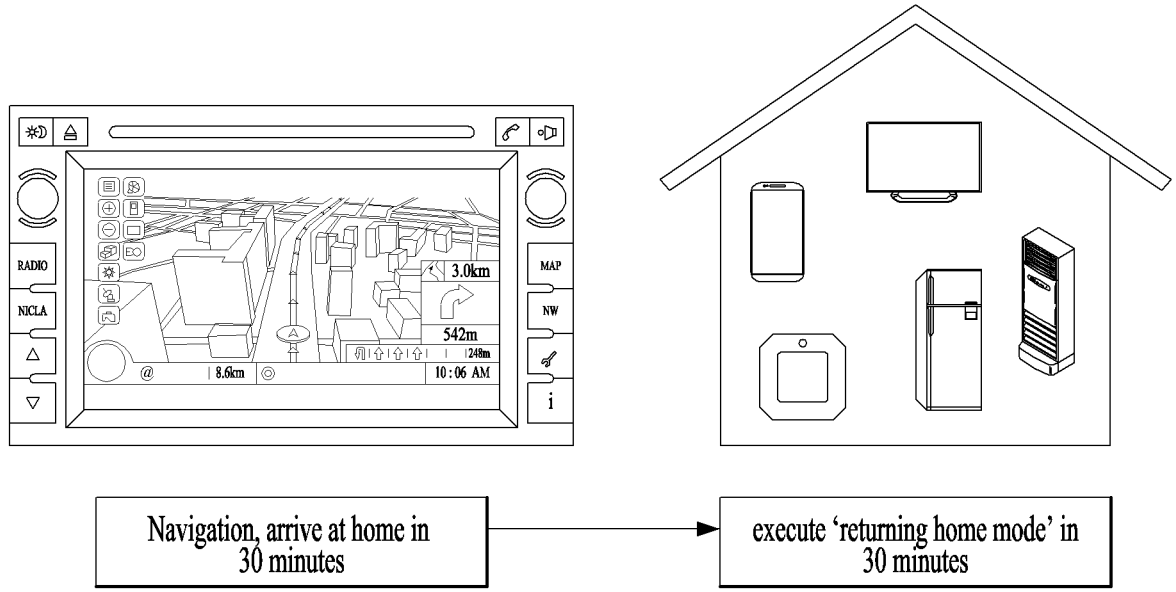
FIGS. 60 to 62 are diagrams for a further different embodiment of automatically entering a mode preferred by a user using a mobile messenger.
Figure 61:
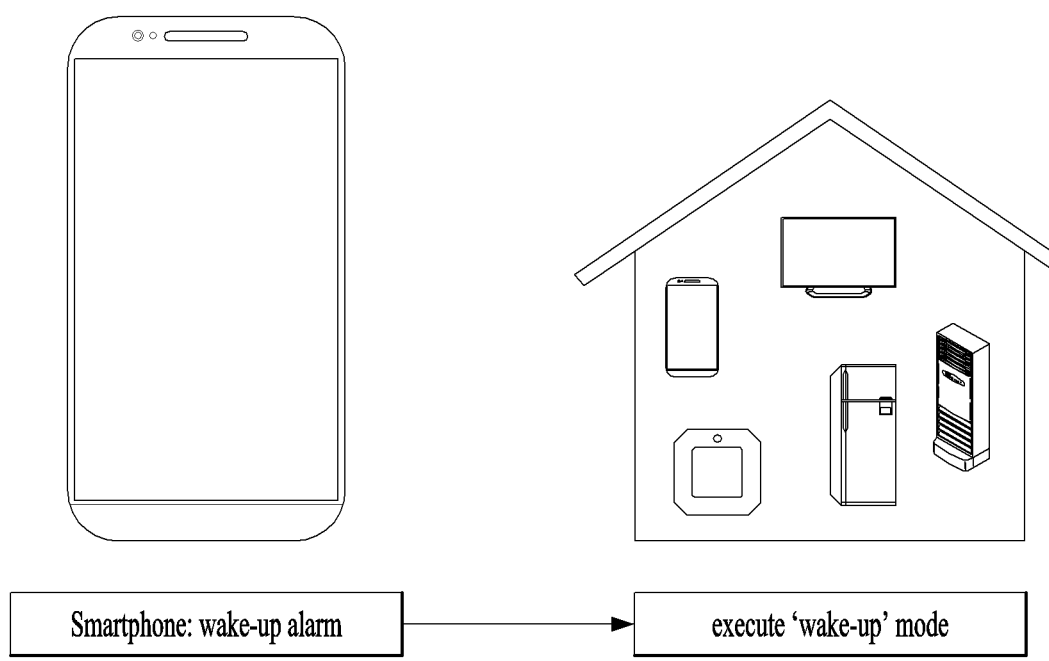
Figure 62:
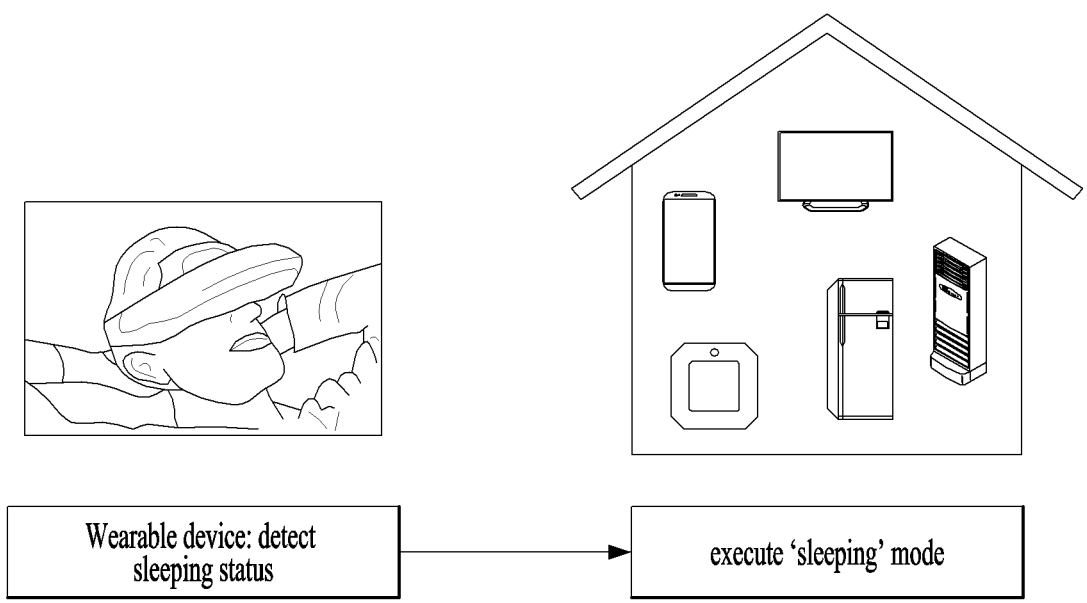

FIGS. 60 to 62 are diagrams for a further different embodiment of automatically entering a mode preferred by a user using a mobile messenger.

In FIGS. 56 to 59, it is assumed a case that a mobile terminal receives a mobile messenger, a text message or e-mail-related data. On the contrary, in FIGS. 60 to 62, data received by a different device instead of the mobile terminal is analyzed and then devices at home registered at HomeChat in advance are automatically controlled.

For example, as shown in FIG. 60, if navigation registered at the HomeChat (M2) in advance generates or displays such a message as "arriving at home after prescribed time", the HomeChat executes a returning home mode. For example, the returning home mode may indicate that power status of all devices registered at the HomeChat in advance are changed to ON.

Moreover, as shown in FIG. 61, if "wake-up alarm" of a smartphone registered at the HomeChat (M2) in advance is set, the HomeChat is designed to execute a wake-up mode at corresponding wake-up time. Unlike the aforementioned returning home mode, the wake-up mode changes power status of partial devices registered at the HomeChat in advance to ON only. Of course, as mentioned in the foregoing description, a device and a specific function controlled in the wake-up mode, the returning home mode can be randomly edited by a user. This also belongs to the scope of the present invention.

Lastly, as shown in FIG. 62, if a wearable device registered at the HomeChat (M2) in advance detects a sleeping status (e.g., pupil is not seen), the HomeChat executes a sleeping mode. For example, the sleeping mode may indicate that power statuses of all devices registered at the HomeChat in advance are changed to OFF.

Figure 63:
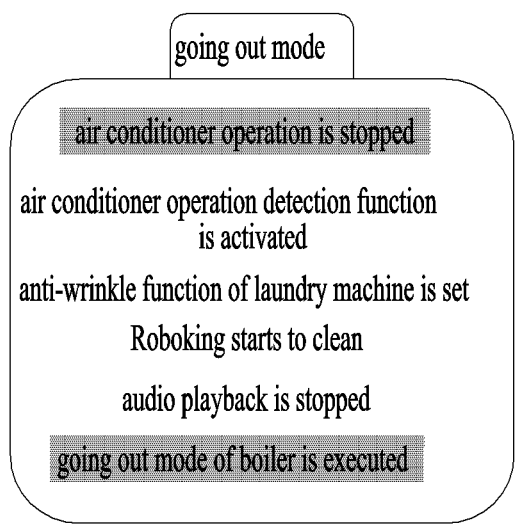
Figure 65:

FIGS. 63 to 65 are diagrams for a further different embodiment of automatically entering a mode preferred by a user using a mobile messenger.

As shown in FIG. 63, if a going out mode is executed, it is assumed that air conditioner operation is stopped, an air conditioner operation detection function is activated, an anti-wrinkle function of a laundry machine is set when washing is performed, Roboking (cleaner) starts to clean, audio playback is stopped, a going out mode of a boiler is executed. In particular, if a user inputs such a word as "execute going out mode" by designating the HomeChat as a counterpart, the aforementioned functions are all executed.

Meanwhile, the embodiment proposed in FIGS. 64 and 65 corresponds to a method of determining FIG. 63 in other way. In particular, as shown in FIG. 64, if a mobile terminal according to one embodiment of the present invention executes a mobile messenger and then inputs commands corresponding to at least two functions selected from among the functions set as the going out mode mentioned earlier in FIG. 63 by designating the HomeChat as a counterpart, as shown in FIG. 65, a message for inquiring whether to execute the going out mode is outputted. Hence, although a user does not explicitly input "going out mode" or the user has no idea about such a function as a going out mode, a function for recommending the going out mode is available.

In FIG. 65, if a user inputs a text for accepting the going out mode, other functions not inputted in FIG. 64 ("audio stop", "air conditioner operation detection starts", "cleaner starts", "an anti-wrinkle function of a laundry machine is set") are controlled to be automatically executed.

The present invention mentioned in the foregoing description can be implemented by codes readable by a computer in media in which a program is recorded. Media readable by a computer includes all kinds of recording devices in which data readable by a computer system is stored.

Examples of the media readable by a computer include a HDD (hard disk drive), an SSD (solid state disk), an SDD (silicon disk drive), a ROM, a RAM, a CD-ROM, a magnetic tape, a floppy disk, an optical data storing device and the like. And, the media can be implemented in a form of a carrier wave (e.g., transmission via the internet). And, the computer may include a controller 180 of a terminal. While the present specification has been described and illustrated herein with reference to the preferred embodiments and diagrams thereof, the present specification may be non-limited to the aforementioned embodiments. Thus, it is intended that the present specification covers the modifications and variations of this invention that come within the scope of the appended claims and their equivalents.

Moreover, data for executing the present invention can be downloaded in an application form via the Internet. It is apparent to those skilled in the art that both a manufacturer of an application and a manufacturer of a mobile terminal inducing to download the application belong to the scope of the present invention.

MODE FOR INVENTION

In the aforementioned list, mode for invention has already been described in various ways.

INDUSTRIAL APPLICABILITY

Since the present invention is applicable to a mobile terminal and the like, it is natural that there exists industrial applicability.

What is claimed is:

1. A method of controlling a mobile terminal, the method comprising:
   executing a mobile messenger application and displaying a messenger display screen on the mobile terminal;
   starting a message conversation using the mobile messenger application with a virtual counterpart controlling a plurality of registered external devices included in a home and connected together by a network;
   receiving contents of a first message input to the mobile terminal through the mobile messenger application and directed to the virtual counterpart and displaying the received contents on the messenger display screen;

analyzing the contents of the first message to determine if the contents include a first command indirectly indicating to turn off power of all of the plurality of registered external devices controlled by the virtual counterpart;

in response to the analyzed contents of the first message including the first command indirectly indicating to turn off the power of all of the plurality of registered external devices, displaying a message on the messenger display screen inquiring if the virtual counterpart is to control the power to all of the plurality of registered external devices to an off status;

displaying, on the messenger display screen, contents of a second message input by another mobile terminal through the mobile messenger application and directed to the virtual counterpart;

analyzing the contents of the second message to determine if the contents include a second command for controlling the plurality of external devices by the virtual counterpart that is in conflict with the first command; and in response to the analyzed contents of the second message including the second command that is in conflict with the first command, automatically and without user selection, executing a group chat with the mobile terminal and the another mobile terminal.

2. The method of claim 1, wherein the first command and the second command are determined to be in conflict with each other only when a difference between a first time of receiving the first command and a second time of receiving the second command is greater than a predetermined time interval.

3. The method of claim 1, wherein, if the first command and the second command are determined to be in conflict with each other, the method further comprises displaying an option for inquiring whether to maintain a current status of a device according to the first command or change a current status of at least one of the all external devices according to the second command.

4. The method of claim 3, wherein the option is displayed in a vote form.

5. The method of claim 1, further comprising:
analyzing texts contained in the automatically executed group chat; and
controlling a status of all the external devices to be maintained or changed according to a result of the analysis.

6. The method of claim 1, wherein the message conversation using the mobile messenger application is started via a touch interface or a voice interface.

7. The method of claim 1, wherein the mobile terminal corresponds to a mobile phone, a tablet PC, or a laptop (notebook).

8. The method of claim 1, wherein the first command disables all the external devices to be in an off state while the second command enables a specific external device to be in an on state.

9. The method of claim 1, wherein the first command sets a mode of at least one of the external devices, and
wherein the second command conflicts with the set mode.

10. A mobile terminal, comprising:
a display;
a processor configured to:
execute a mobile messenger application and display a messenger display screen on the display;
start a message conversation using the mobile messenger application with a virtual counterpart controlling a plurality of registered external devices included in a home and connected together by a network;
receive contents of a first message input to the mobile terminal through the mobile messenger application and directed to the virtual counterpart and displaying the received contents on the messenger display screen;
analyze the contents of the first message to determine if the contents include a first command indirectly indicating to turn off power of all of the plurality of registered external devices controlled by the virtual counterpart;
in response to the analyzed contents of the first message including the first command indirectly indicating to turn off the power of all of the plurality of registered external devices, display a message on the messenger display screen inquiring if the virtual counterpart is to control the power to all of the plurality of registered external devices to an off status control the power to all of the plurality of registered external devices to an off status;
display, on the messenger display screen, contents of a second message input by another mobile terminal through the mobile messenger application and directed to the virtual counterpart;
analyze the contents of the second message to determine if the contents include a second command for controlling the plurality of external devices by the virtual counterpart that is in conflict with the first command; and
in response to the analyzed contents of the second message including the second command that is in conflict with the first command, automatically and without user selection, execute a group chat with the mobile terminal and the another mobile terminal.

11. The mobile terminal of claim 10, wherein the first command and the second command are determined to be in conflict with each other only when a difference between a first time of receiving the first command and a second time of receiving the second command is greater than a predetermined time interval.

12. The mobile terminal of claim 10, wherein, if the first command and the second command are determined to be in conflict with each other, the processor is further configured to display an option inquiring whether to maintain a current status of a device according to the first command or change a current status of at least one of the all external devices according to the second command.

13. The mobile terminal of claim 10, wherein the processor is further configured to:
analyze texts contained in the automatically executed group chat; and
control a status of all the external devices to be maintained or changed according to a result of the analysis.

14. The mobile terminal of claim 10, wherein the message conversation using the mobile messenger application is started via a touch interface or a voice interface of the mobile terminal.

15. The mobile terminal of claim 10, wherein the indirect command is not a direct command to turn off power of all of the plurality of registered external devices.

* * * * *